(12) United States Patent
Avgeropoulos et al.

(10) Patent No.: US 12,415,881 B2
(45) Date of Patent: Sep. 16, 2025

(54) AMPHIPHILIC TRIBLOCK COPOLYMER

(71) Applicants: 3M INNOVATIVE PROPERTIES COMPANY, St. Paul, MN (US); University of Ioannina, Ioannina (GR); Apostolos Avgeropoulos, Anatoli Ioannina (GR)

(72) Inventors: Apostolos Avgeropoulos, Ioannina (GR); Dimitrios Moschovas, Aitoloakarnania (GR); Michelle Man-Shau Mok, St. Paul, MN (US); Timothy Martin Gillard, St. Paul, MN (US); Carl Andrew Laskowski, Minneapolis, MN (US); Lucas David McIntosh, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 928 days.

(21) Appl. No.: 17/595,359

(22) PCT Filed: May 7, 2020

(86) PCT No.: PCT/EP2020/062757
§ 371 (c)(1),
(2) Date: Nov. 15, 2021

(87) PCT Pub. No.: WO2020/229308
PCT Pub. Date: Nov. 19, 2020

(65) Prior Publication Data
US 2022/0195102 A1 Jun. 23, 2022

(30) Foreign Application Priority Data
May 16, 2019 (EP) .................................. 19386029

(51) Int. Cl.
C08F 297/04 (2006.01)
B01D 71/26 (2006.01)
B01D 71/28 (2006.01)

(52) U.S. Cl.
CPC ........ *C08F 297/046* (2013.01); *B01D 71/262* (2022.08); *B01D 71/281* (2022.08)

(58) Field of Classification Search
CPC .. C08F 297/046; B01D 71/281; B01D 71/262
See application file for complete search history.

(56) References Cited

U.S. PATENT DOCUMENTS

| RE27,145 E | 6/1971 | Jones |
| 4,039,593 A | 8/1977 | Kamienski |
| 4,501,911 A | 2/1985 | Koerner |
| 5,290,397 A | 3/1994 | Ober |
| 2003/0096904 A1* | 5/2003 | Hakuta ............... C09D 123/16 524/588 |
| 2011/0213066 A1* | 9/2011 | Wang .................. C08F 297/046 977/773 |
| 2016/0369015 A1 | 12/2016 | Doring |

FOREIGN PATENT DOCUMENTS

| JP | 2004-346140 | 12/2004 |
| WO | WO 2017-109429 | 6/2017 |
| WO | WO 2018-097988 | 5/2018 |
| WO | WO 2018-098023 | 5/2018 |
| WO | WO 2018-152075 | 8/2018 |
| WO | WO 2019-023135 | 1/2019 |
| WO | WO 2019-177953 | 9/2019 |
| WO | WO 2019-177972 | 9/2019 |
| WO | WO 2019-229680 | 12/2019 |

OTHER PUBLICATIONS

Dorin R.M. et al., Designing block copolymer architectures for targeted membrane performance, 55 Polymer 347 (2014) (Year: 2014).*
Jeon, H.G. et al., Microphase and macrophase transitions in binary blends of diblock copolymers, 32 Macromolecules 1803 (1999) (Year: 1999).*
Guo, "Catalytic hydrosilylation of diene-based polymers. 2, Hydrosilylation of styrene-butadiene copolymer and nitrile-butadiene copolymer", Macromolecules, 1992, vol. 25, No. 2, pp. 883-886.
Halasa, "Anionic polymerization to high vinyl polybutadiene", J. Polymer Sci.: Polymer Chem., 1981, vol. 19, pp. 1357-1360.
Hsieh, "Stereochemistry of polymerization", Chapter 9 Anionic Polymerization: Principles and Practical Applications; Plastics engineering, 1996, pp. 197-235.
Mansour, "Thermodynamic characteristics of poly(cyclohexylethlene-b-ethylene-co-ethylethylene) block copolymers", J. Polym. Sci. Part B Polym. Phys., 2010, vol. 48, No. 5, pp. 566-574.
Parker, "1,2-Selective Hydrosilylation of conjugated dienes", Journal of the American chemical society, 2014, vol. 136, No. 13, pp. 4857-4860.
International Search report for PCT International Application No. PCT/EP2020/062757 mailed on Jul. 28, 2020, 5 pages.

* cited by examiner

*Primary Examiner* — Robert C Boyle
(74) *Attorney, Agent, or Firm* — Jean A. Lown; Julie Lapos-Kuchar

(57) ABSTRACT

Amphiphilic triblock copolymers, articles containing the amphiphilic triblock copolymers, and methods of making these block copolymers provided. The amphiphilic triblock copolymers contain a first block (an A block) derived from isoprene, a second block (a B block) derived from a vinyl aromatic such as styrene, and a third block (a C block) derived from butadiene that have been subjected to hydrosilylation.

18 Claims, 1 Drawing Sheet

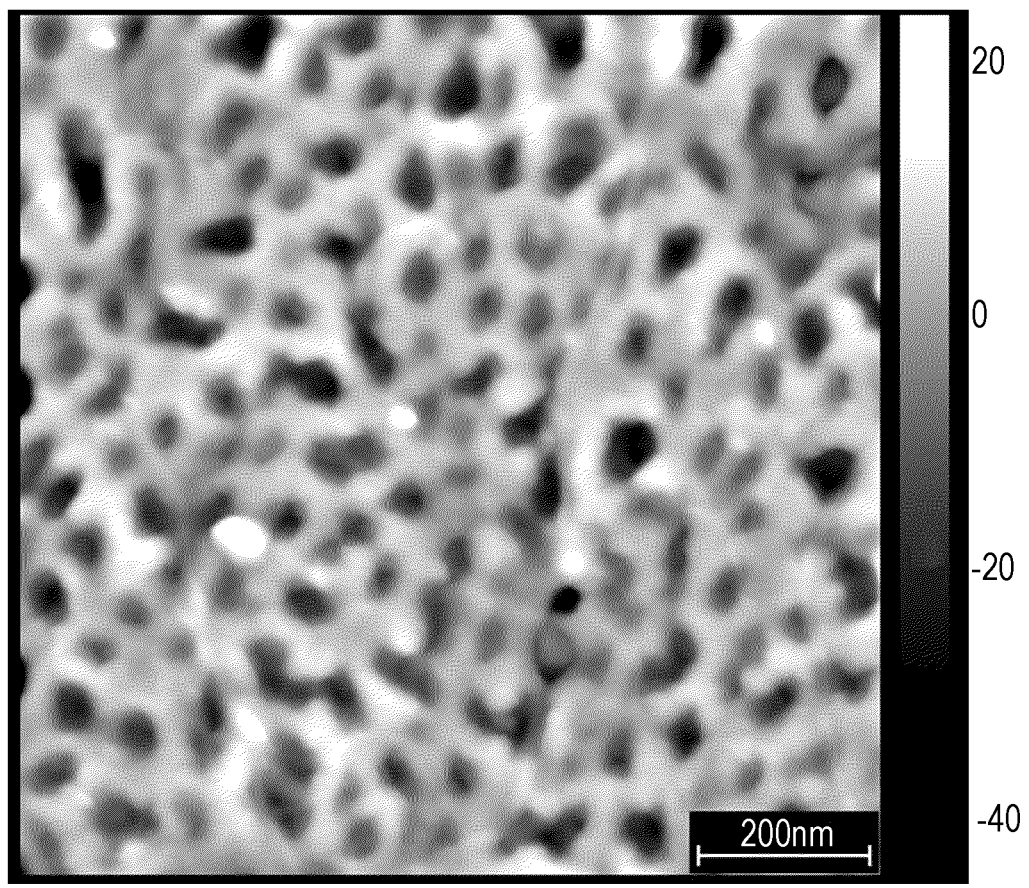

AMPHIPHILIC TRIBLOCK COPOLYMER

CROSS REFERENCE TO RELATED APPLICATIONS

This application is a national stage filing under 35 U.S.C. 371 of PCT/EP2020/062757, filed May 7, 2020, which claims the benefit of European Patent Application No. 19386029.3, filed May 16, 2019, the disclosure of which is incorporated by reference in its/their entirety herein.

BACKGROUND

Amphiphilic block copolymers are polymeric materials that contain discrete non-polar and polar domains or blocks. The different blocks can have different solubility, affinity, and/or miscibility with different solutions or surfaces. If the amphiphilic block copolymer is used for surface modification or as a primer, for example, a first block typically binds to one surface while another block or blocks will phase separate from the first block to limit interactions with that surface. For example, in the case of low surface energy substrates, interactions with poly(isoprene), poly(butadiene), poly(ethylene), or poly(styrene) blocks or domains are energetically favorable while interactions with poly(ethylene oxide) and poly(propylene oxide) are not.

The synthesis of amphiphilic block copolymers presents a challenge. While controlled radical polymerization methodology is a powerful technique to produce block copolymers, commercial offerings of such block copolymers derived from this methodology are quite limited. Instead, most commercially available block copolymers are prepared by anionic polymerization. While anionic polymerization often results in the formation of copolymers with a low polydispersity index (PDI) and high molecular weight such as greater than 50,000 Daltons, altering the hydrophilicity or functionality of a given block can be challenging.

Post-polymerization modification of polymers formed using anionic polymerization methods is known. For example, a block derived from dienes can be modified while a block derived from styrene can remain unchanged. While the resulting modified block copolymers may be amphiphilic, they are often brittle when functionalized to a high degree.

SUMMARY

Amphiphilic triblock copolymers, articles containing the amphiphilic triblock copolymers, and methods of making these block copolymers are provided. The amphiphilic triblock copolymers contain a first block (an A block) derived from isoprene, a second block (a B block) derived from a vinyl aromatic monomer such as styrene, and a third block (a C block) derived from butadiene that have been subjected to hydrosilylation.

In a first aspect, an amphiphilic triblock copolymer is provided that is linear and that contains 20 to 45 mole percent A block, 40 to 65 mole percent B block, and 5 to 30 mole percent C blocks based on total moles of repeat units in the amphiphilic triblock copolymer. The A block comprises poly(isoprene) and greater than 90 mole percent of the repeat units in the A block are of Formula (I-A).

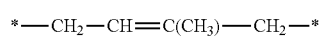
(I-A)

The B block comprises a poly(vinyl aromatic). Greater than 30 mole percent of the repeat units in the C block are hydrosilylated 1,2-butadiene repeat units of Formula (IV-A) or Formula (IV-B).

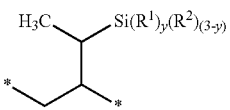
(IV-A)

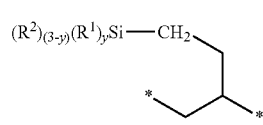
(IV-B)

In Formulas (IV-A) and (IV-B), $R^1$ is an alkyl or aryl and $R^2$ is a group of formula —O—$(R^3$—O$)_p$—$R^4$. Group $R^3$ is an alkylene and $R^4$ is an alkyl. The variable y in an integer equal to 1 or 2 and the variable p is an integer in a range of 0 to 20. An asterisk (*) indicates a binding site to another repeat unit or terminal group of the amphiphilic triblock copolymer.

In a second aspect, an article is provided that includes an amphiphilic triblock copolymer as described in the first aspect.

In a third aspect, a method of forming an amphiphilic triblock copolymer is provided. The method includes providing or obtaining a triblock precursor copolymer that contains 20 to 45 mole percent $A^1$ block, 40 to 65 mole percent $B^1$ block, and 5 to 30 mole percent $C^1$ blocks based on total moles of repeat units in the precursor triblock copolymer. The $A^1$ block comprises poly(isoprene) and greater than 90 mole percent of the repeat units in the $A^1$ block are of Formula (I-A)

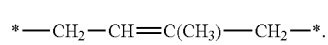
(I-A)

The $B^1$ block comprises a poly(vinyl aromatic) and greater than 30 mole percent of the repeat units in the $C^1$ block are 1,2-butadiene repeat units of Formula (VII).

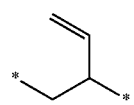
(VII)

The method further includes reacting the 1,2-butadiene repeat units in the $C^1$ block of the precursor triblock copolymer with a halogenated silane of Formula (VIII)

(VIII)

in the presence of an organometallic catalyst to form a halogenated intermediate triblock copolymer having repeat units of Formula (IX-A) and Formula (IX-B).

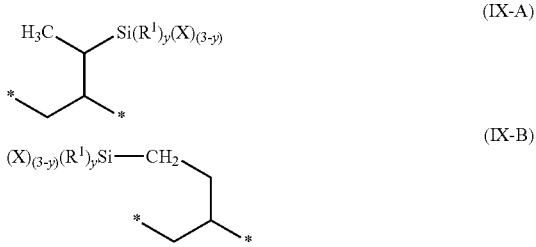

(IX-A)

(IX-B)

In Formula (IX-A) and Formula (IX-B), group $R^1$ is an alkyl or aryl, X is a halo, and the variable y is an integer equal to 1 or 2. The method still further includes treating the intermediate triblock copolymer with a compound of Formula (X)

(X)

to form the amphiphilic triblock copolymer having a C block comprising repeat units of Formula (IV-A) and Formula (IV-B).

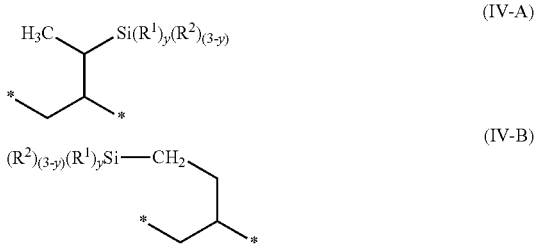

(IV-A)

(IV-B)

wherein $R^2$ is a group of formula $-O-(R^3-O)_p-R^4$, group $R^3$ is an alkylene, and group $R^4$ is an alkyl. The variable p is an integer in a range of 0 to 20 and an asterisk (*) indicates a binding site to another repeat unit or terminal group of the triblock copolymer (i.e., the precursor triblock copolymer, the halogenated intermediate triblock copolymer, or the amphiphilic triblock copolymer).

BRIEF DESCRIPTION OF THE DRAWINGS

FIG. 1 is an atomic force micrograph of an example porous membrane (E17).

DETAILED DESCRIPTION

Linear, amphiphilic triblock copolymers are provided that are formed from a precursor triblock copolymer that contains a first block derived from isoprene, a second block derived from a vinyl aromatic monomer such as styrene or a styrene-type monomer, and a third block derived from butadiene. The precursor triblock copolymer is subjected to hydrosilylation (including treatment with an alkoxide or poly(alkoxide) to replace any halo groups introduced by hydrosilylation) to form the amphiphilic triblock copolymer. Typically, it is the block derived from butadiene in the precursor triblock copolymer that reacts when subjected to hydrosilylation.

The three blocks of the amphiphilic triblock copolymer can be referred to as an A block, a B block, and a C block. The blocks can be arranged in any desired order such as ABC, BCA, or BAC. In some embodiments, the amphiphilic triblock copolymer is an ABC triblock copolymer. As used herein, the A block is derived from isoprene and is referred to interchangeably as polyisoprene or as the polyisoprene block. The B block is derived from an aromatic vinyl monomer and is referred to interchangeably as poly(vinyl aromatic) or as the poly(vinyl aromatic) block. The C block is derived from butadiene and this is the block that reacts most readily when subjected to hydrosilylation. The C block contains pendant silyl groups and is referred to interchangeably as hydrosilylated poly(butadiene) or as the hydrosilylated poly(butadiene) block. The three blocks are not all miscible with each other and form separate domains within the triblock copolymer.

As used herein, "a", "an", and "the" are used interchangeably and mean one or more.

The term "and/or" is used to indicate one or both stated cases may occur, for example X and/or Y includes (X and Y) and (X or Y). Thus, the term can be used to mean X alone, Y alone, or both X and Y.

The term "alkyl" refers to a monovalent group that is a radical of an alkane and includes linear, branched, cyclic, bicyclic alkyl groups, and combinations thereof. Unless otherwise indicated, the alkyl groups typically contain from 1 to 24 carbon atoms. There can be at least 1, at least 2, at least 3, or at least 4 carbon atoms and up to 24, up to 20, up to 18, up to 16, up to 12, up to 10, up to 6, up to 4, or up to 3 carbon atoms. In some embodiments, the alkyl groups contain 1 to 20, 1 to 10, 1 to 6, 1 to 4, or 1 to 3 carbon atoms. In certain embodiments, the alkyl groups include 2 to 24 or 4 to 24 carbon atoms. Examples of "alkyl" groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene" refers to a divalent group that is a radical of an alkane and includes linear, branched, cyclic, bicyclic alkylene groups, and combinations thereof. Unless otherwise indicated, the alkylene groups typically contain from 1 to 24 carbon atoms. There can be at least 1, at least 2, at least 3, or at least 4 carbon atoms and up to 24, up to 20, up to 18, up to 16, up to 12, up to 10, up to 6, up to 4, or up to 3 carbon atoms. In some embodiments, the alkylene groups contain 1 to 20, 1 to 10, 1 to 6, 1 to 4, or 1 to 3 carbon atoms. In certain embodiments, the alkylene groups include 2 to 24 or 4 to 24 carbon atoms. Example alkylene groups include, but are not limited to, methylene, ethylene, n-propylene, n-butylene, n-pentylene, isobutylene, t-butylene, isopropylene, n-octylene, n-heptylene, ethylhexylene, cyclopentylene, cyclohexylene, cycloheptylene, adamantylene, norbornylene, and the like.

The term "aryl" refers to a monovalent group that is aromatic and carbocyclic. The aryl has at least one aromatic ring. Any additional rings can be saturated, unsaturated, or aromatic. Optionally, the aromatic ring can have one or more additional carbocyclic rings that are fused to the aromatic ring. Unless otherwise indicated, the aryl groups typically contain from 6 to 30 carbon atoms. There can be at least 6, at least 10, or at least 14 carbon atoms and up to 24, up to 20, up to 18, up to 12, or up to 10 carbon atoms. In some embodiments, the aryl groups contain 6 to 24, 6 to 20, 6 to 18, 6 to 16, 6 to 12, or 6 to 10 carbon atoms. Examples of an aryl group include phenyl, naphthyl, biphenyl, phenanthryl, and anthracyl.

The term "copolymer" refers to a polymeric material that is formed from more than one monomer and contains more than one type of repeat unit. A terpolymer is a type of copolymer.

The term "monomer" refers to compounds that can be polymerized using free radical or anionic polymerization techniques. Example monomers include styrene, isoprene, and butadiene. After polymerization, the polymeric material includes "repeat units" derived from the monomers.

The term "1,3-butadiene" refers to the monomer $CH_2=CH—CH=CH_2$.

The term "1,4-butadiene repeat unit" refers to a repeat unit derived from 1,3-butadiene that is of Formula (VI).

(VI)

The term "1,2-butadiene repeat unit" refers to a repeat unit derived from 1,3-butadiene that is of Formula (VII).

(VII)

An asterisk (*) in a formula for a repeat unit indicates the point of attachment of the repeat unit to another repeat unit or to another group (e.g., a terminal group) in the polymeric material, which can be a precursor triblock copolymer, halogenated intermediate triblock copolymer, or amphiphilic triblock copolymer.

The term "hydrosilylated" refers to a group that has undergone hydrosilylation or both hydrosilylation and further treatment with an alkoxide or poly(alkoxide) to replace any halogen groups introduced by hydrosilylation.

The term "alkoxide" compound refers to a compound of formula $HO—(R^3—O)_p—R^4$ where the variable p is equal to zero and the term "poly(alkoxide) refers to a compound of the same formula where the variable p is greater than 1, greater than 2, or greater than 3. In this formula, $R^3$ is an alkylene and $R^4$ is an alkyl.

The term "in the range" or "within a range" (and similar statements) includes the endpoints of the stated range. Also, herein, the recitations of numerical ranges by endpoints include all numbers subsumed within that range as well as the endpoints (e.g., 1 to 5 includes 1, 1.5, 2, 2.75, 3, 3.80, 4, 5, etc.).

The A block of the amphiphilic triblock copolymer is derived from isoprene. That is, the A block contains poly (isoprene). In most embodiments, greater than 90 mole percent of the repeat units in the A block are of Formula (I-A).

(I-A)

The A block typically contains at least 90 mole percent, at least 92 mole percent, at least 94 mole percent, at least 95 mole percent, at least 96 mole percent, at least 98 mole percent, at least 99 mole percent and up to 100 mole percent, up to 98 mole percent, up to 96 mole percent, or up to 95 mole percent repeat units of Formula (I-A). Formula (I-A) can be in a cis or trans configuration.

In addition to repeat units of Formula (I-A), the A block of the amphiphilic triblock copolymer may contain other optional repeat units. One optional repeat unit is of Formula (I-B).

(I-B)

The amount of the repeat units of Formula (I-B) can vary depending on how the isoprene is produced and/or purified. The A block may be free of repeat units of Formula (I-B) or may contain at least at least 1 mole percent, at least 2 mole percent, at least 4 mole percent, at least 5 mole percent, at least 6 mole percent, at least 8 mole percent, and up to 10 mole percent, up to 8 mole percent, up to 6 mole percent, or up to 5 mole percent repeat units of Formula (I-B). The mole percent amount is based on the total moles of repeat units in the A block.

Isoprene repeat units of Formulas (I-A) and (I-B) typically do not undergo hydrosilylation to form the amphiphilic triblock copolymer from the precursor copolymer. That is, the A block (i.e., the polyisoprene block) in the amphiphilic triblock copolymer is often free of hydrosilylated repeat units. Depending on the severity of the reaction conditions and the selected catalyst, however, a small amount of the repeat units in the A block may undergo hydrosilylation. The repeat units that are more prone to hydrosilylation are those of Formula (I-B) having a pendant vinyl group. Such hydrosilylated isoprene repeat units are usually of Formula (II).

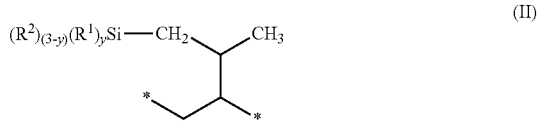

(II)

In Formula (II), $R^1$ is an alkyl or aryl, $R^2$ is of formula $—O—(R^3—O)_p—R^4$, $R^3$ is an alkylene, and $R^4$ is an alkyl. The variable y is an integer equal to 1 or 2 and the variable p is an integer in a range of 0 to 20. The repeat units of Formula (I-A) typically do not undergo hydrosilylation.

Typically, no more than 5 mole percent, no more than 4 mole percent, no more than 3 mole percent, no more than 2 mole percent, no more than 1 mole percent, no more than 0.5 mole percent, no more than 0.2 mole percent, or no more than 0.1 mole percent of the isoprene repeat units undergo hydrosilylation to form repeat units of Formula (II). That is, the conditions of hydrosilylation are typically selected so that the A block does not react or reacts only to a small extent.

Overall, 20 to 45 mole percent of the repeat units in the amphiphilic triblock copolymer are in the A block. The amount of A block can be at least 20 mole percent, at least 25 mole percent, or at least 30 mole percent and up to 45 mole percent, up to 40 mole percent, up to 35 mole percent, up to 30 mole percent, or up to 25 mole percent of the amphiphilic triblock copolymer. The amount is based on total moles of repeat units in the amphiphilic block copolymer.

The A blocks tend to provide an elastomeric domain within the amphiphilic triblock copolymer. The glass transition temperature of this block is typically no greater than 20° C., no greater than 10° C., no greater than 0° C., or no greater than −10° C. and greater than −100° C. or greater than −80° C. or greater than −60° C. when measured using Differential Scanning Calorimetry.

The B block of the amphiphilic triblock copolymer is derived from a vinyl aromatic monomer and the B block can be referred to as poly(vinyl aromatic). Typically, the only repeat units in the B block are derived from vinyl aromatic monomers. That is, at least 90 mole percent, at least 92 mole percent, at least 95 mole percent, at least 97 mole percent, at least 98 mole percent, at least 99 mole percent and up to 100 mole percent of the B block is derived from vinyl monomers. If any other repeat units are present, they are present in an amount no greater than 10 mole percent, no greater than 8 mole percent, no greater than 5 mole percent, no greater than 3 mole percent, no greater than 2 mole percent, or no greater than 1 mole percent. The amounts are based on total moles of repeat units in the B block. The B block typically does not react during hydrosilylation of the precursor triblock copolymer to form the amphiphilic triblock copolymer.

While any vinyl aromatic monomer can be used, this monomer is typically a styrene-type monomer. The term "styrene-type" monomer refers to styrene and/or alpha-methyl styrene that is optionally substituted with one of more alkyl groups. The styrene-type monomers are of Formula (III-A) and/or Formula (III-B).

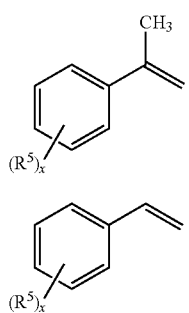

In these formulas, $R^5$ is an optional alkyl and the variable x is an integer in a range from 0 to 3. That is, the aromatic ring optionally can be substituted with up one, two, or three alkyl groups. Any alkyl group substituent usually has 1 to 6 carbon atoms, 1 to 4 carbon atoms, or 1 to 3 carbon atoms. Examples of styrene-type monomers include, but are not limited to, 2-methylstyrene, 3-methylstyrene, 4-methylstyrene, 2,4-dimethylstyrene, 3,4-dimethylstyrene, 2,4,6-trimethylstyrene, 4-ethylstyrene, diethyl styrene, di-n-butylstyrene, 2,4-diisopropylstyrene, 3-tert-butylstyrene, 4-tert-butylstyrene, and alpha-methylstyrene.

In some embodiments, other vinyl aromatic monomers can be used such as, for example, vinyl naphthalene, 4-chlorostyrene, 3-chlorostyrene, 4-bromostyrene, 4-fluorostyrene, and 2,6-dichlorostyrene.

In most embodiments, the B block has a glass transition temperature of at least 90° C. when measured using differential scanning calorimetry. The glass transition temperature is often at least 95° C., at least 100° C., at least 105° C., at least 110° C., or at least 115° C. Depending on the use of the amphiphilic triblock copolymer, the glass transition temperature of the B block can help ensure that there is adequate thermal stability at room temperature and above. The B block provides a hard, glassy domain within the amphiphilic triblock copolymer Overall, 40 to 65 mole percent of the repeat units in the amphiphilic triblock copolymer are in the B block. The amount can be at least 40 mole percent, at least 45 mole percent, at least 50 mole percent, or at least 55 mole percent and up to 65 mole percent, up to 60 mole percent, up to 55 mole percent, or up to 50 mole percent. The amount is based on total moles of repeat units in the amphiphilic block copolymer.

In many embodiments such as, for example, when the triblock copolymer is used to form a porous polymeric material, the ratio of the mole percent of repeat units in the B block to the mole percent of repeat units in the A block is in the range of 3:1 to 1:1. When the mole ratio is in this range, the amphiphilic triblock copolymer tends to form micelles in certain solvents and/or solvent blends such as, for example, blends of N-methyl-2-pyrrolidone and tetrahydrofuran (NMP/THF) or dimethylacetamide and tetrahydrofuran (DMAc/THF). The ratio of the mole percent of repeat units in the B block to the mole percent of repeat units in the A block is in the range of can be, for example, at least 1:1, at least 1.5:1, at least 2:1, at least 2.5:1 and up to 3:1, up to 2.5:1, or up to 2:1. Each mole percent used to calculate the ratio is based on the total repeat units in the amphiphilic triblock copolymer.

Further, in some embodiments, the combined mole percent of repeat units in the A block and B block is in a range of 70 to 95 mole percent. If the amount is greater than 95 mole percent, there may be an insufficient amount of the C block and the triblock copolymer may not be sufficiently amphiphilic and/or may not form micelles in certain solvents and/or solvent blends such as, for example, NMP/THF or DMAc/THF. If the amount is less than 70 mole percent, however, the triblock copolymer may not be sufficiently elastomeric and/or may lack thermal stability and/or may swell excessively in aqueous environment. The combined amount can be at least 70 mole percent, at least 75 mole percent, at least 80 mole percent, or at least 85 mole percent and up to 95 mole percent, up to 90 mole percent, or up to 85 mole percent. Each mole percent is based on the total repeat units in the amphiphilic triblock copolymer.

The C block of the amphiphilic triblock copolymer is derived from butadiene (i.e., 1,3-butadiene monomer) and has pendant vinyl groups that are subjected to hydrosilylation. That is, the C block contains hydrosilylated 1,2-butadiene repeat units of Formula (IV-A) and/or Formula (IV-B).

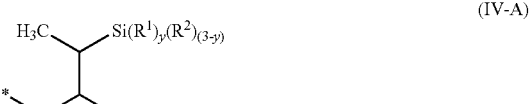

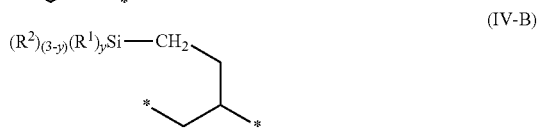

In Formulas (IV-A) and (IV-B), $R^1$ is an alkyl or aryl, $R^2$ is of formula $-O-(R^3-O)_p-R^4$, $R^3$ is an alkylene, and $R^4$ is an alkyl. The variable y is an integer equal to 1 or 2 and the variable p is an integer in a range of 0 to 20. An asterisk (*) indicates a binding site to another repeat unit or terminal group of the triblock copolymer.

Suitable alkyl groups for $R^1$ and $R^4$ usually contain 1 to 10 carbon atoms, 1 to 6 carbon atoms, 1 to 4 carbon atoms, or 1 to 3 carbon atoms. Suitable alkylene groups for $R^3$ usually contain 1 to 10 carbon atoms, 1 to 6 carbon atoms, 1 to 4 carbon atoms, or 1 to 3 carbon atoms. Suitable aryl groups for $R^1$ usually contain 6 to 12 or 6 to 10 carbon atoms and are often phenyl, biphenyl, or naphthyl. The variable p can be in a range of 0 to 20, 0 to 16, 0 to 12, 0 to 10, 0 to 8, 0 to 6, 0 to 4, or 0 to 2. The value of p is often 0.

At least 30 mole percent of the repeat units in the C block are of Formula (IV-A) and/or Formula (IV-B). The amount is based on the total moles of repeat units in the C block. The C block can contain at least 35 mole percent, at least 40 mole percent, at least 45 mole percent, at least 50 mole percent, at least 55 mole percent, at least 60 mole percent, at least 65 mole percent, at least 70 mole percent, at least 75 mole percent, at least 80 mole percent, at least 85 mole percent, at least 90 mole percent, or at least 95 mole percent and up to 100 mole percent, up to 95 mole percent, up to 90 mole percent, up to 85 mole percent, up to 80 mole percent, up to 75 mole percent, up to 70 mole percent, up to 65 mole percent, up to 60 mole percent, up to 55 mole percent, or up to 50 mole percent repeat units of Formula (IV-A) and/or (IV-B). The amount of the hydrosilylated 1,2-butadiene repeat units of Formula (IV-A) and/or (IV-B) can be selected to adjust the number of hydrophilic groups in the triblock copolymer.

In addition to the repeat units of Formula (IV-A) and Formula (IV-B), the C block can contain optional repeat units of hydrosilylated 1,4-butadiene repeat units as shown in Formula (V) and/or optional repeat units of 1,4-butadiene (shown in Formula (VI)) that have not undergone hydrosilylation and/or optional repeat units of 1,2-butadiene (shown in Formula (VII)) that have not undergone hydrosilylation.

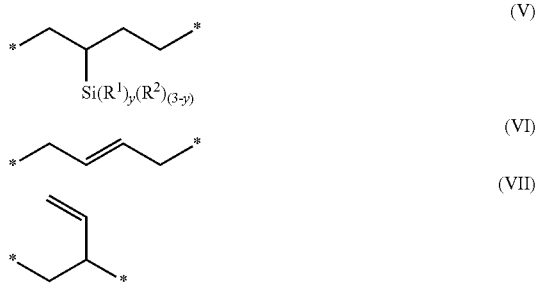

Groups $R^1$ and $R^2$ as well as variable y in Formula (V) are the same as defined above for Formulas (IV-A) and (IV-B).

The amount of the optional repeat units of Formulas (V), (VI), and (VII) in the C block can vary depending on the hydrosilylation conditions selected and the butadiene regiochemistry resulting from the synthesis of the precursor triblock copolymer. In some instances, it may be desirable to avoid hydrosilylation of all the 1,2-butadiene repeat units in the C block to avoid conditions that might result in the hydrosilylation of the A block as well. Up to 70 mole percent (total amount) of the C block can include optional repeat units selected from one or more of Formulas (V), (VI), and (VII). For example, the optional repeat units in the C block can at up to 70 mole percent, up to 65 mole percent, up to 60 mole percent, up to 55 mole percent, up to 50 mole percent, up to 45 mole percent, up to 40 mole percent, up to 35 mole percent, up to 30 mole percent, up to 25 mole percent, up to 20 mole percent, up to 15 mole percent, up to 10 mole percent, or up to 5 mole percent. The C block can be free of the optional repeat units or contain at least 5 mole percent, at least 10 mole percent, at least 15 mole percent, at least 20 mole percent, at least 30 mole percent, at least 35 mole percent, or at least 40 mole percent of the optional repeat units. The mole percent is calculated based on the total moles of repeat units in the C block.

The C block often contains 30 to 100 mole percent repeat units of Formula (IV-A) and/or Formula (IV-B) and 0 to 70 mole percent optional repeat units selected from one or more of Formulas (V), (VI), and (VII) or 30 to 90 mole percent repeat units of Formula (IV-A) and/or Formula (IV-B) and 10 to 70 mole percent optional repeat units selected from one or more of Formulas (V), (VI), and (VII). In some examples, the C block contains 40 to 100 mole percent repeat units of Formula (IV-A) and/or Formula (IV-B) and 0 to 60 mole percent repeat units of one of more of the optional repeat units, 50 to 100 mole percent repeat units of Formula (IV-A) and/or Formula (IV-B) and 0 to 50 mole percent repeat units of one of more of the optional repeat units, 60 to 100 mole percent repeat units of Formula (IV-A) and/or Formula (IV-B) and 0 to 40 mole percent of the optional repeat units, 70 to 100 mole percent repeat units of Formula (IV-A) and/or Formula (IV-B) and 0 to 30 mole percent of the optional repeat units, 80 to 100 mole percent repeat units of Formula (IV-A) and/or Formula (IV-B) and 0 to 20 mole percent of the optional repeat units, or 90 to 100 mole percent repeat units of Formula (IV-A) and/or Formula (IV-B) and 0 to 10 mole percent of the optional repeat units. The mole percent amounts are based on the total moles of repeat units in the C block.

There are multiple, well-studied anionic polymerization methods capable of polymerizing 1,3-butadiene to form polybutadiene containing both 1,2-butadiene and 1,4-butadiene repeat units. The molar ratio of 1,2-butadiene repeat units to 1,4-butadiene repeat units varies depending on the polymerization method used. A first type of polybutadiene is obtained, for example, by conducting the polymerization of 1,3-butadiene in rigorously pure, non-polar solvents (e.g., benzene and/or cyclohexane) that are free of polar additives. The first type of polybutadiene typically contains less than about 10 mole percent 1,2-butadiene repeat units with the remainder being 1,4-butadiene repeat units. A second type of polybutadiene is obtained, for example, by conducting the polymerization of 1,3-butadiene in a reaction mixture containing an etherate additive (e.g., THF, diethyl ether, diglyme, or the like) in a molar ratio of 0.05 to 100 relative to the anionic initiator or living anion chain end (see Hsieh et al., *Anionic Polymerization: Principles and Practical Applications*; Plastics engineering; Dekker: New York, chapter 9, pp 197-235 (1996) and Mansour et al., *J. Polym. Sci. Part B Polym. Phys.*, 48(5), 566-574 (2010)). The second type of polybutadiene typically contains mainly 1,2-butadiene repeat units and often contains about 60 to about 80 mole percent 1,2-butadiene repeat units with the remainder being 1,4-butadiene repeat units. A third type of polybutadiene can be obtained, for example, by conducting the polymerization of 1,3-butadiene in a reaction mixture containing 1,2-dipiperidinoethane in a molar ratio of 0.50 to 10 relative to anionic initiator or living anion chain end (see Hall et al., *J. Polymer Sci.: Polymer Chem.*, 19, 1357 (1981)). The third type of polybutadiene contains predominately 1,2-butadiene repeat units and often contains greater than 90 mole percent 1,2-butadiene repeat units with the remainder being 1,4-butadiene repeat units. The second or third types of polybutadiene are often preferred, particularly for preparation of porous membranes containing the amphiphilic triblock copolymers.

If the precursor triblock copolymer contains a mixture of both 1,2-butadiene repeat units and 1,4-butadiene repeat units, the 1,2-polybutadiene repeat units tend to react more readily when subjected to hydrosilylation. In some embodiments, the ratio of moles of 1,2-butadiene repeat units to moles of 1,4-butadiene repeat units that undergoes hydrosilylation is about 2:1 but this ratio can vary depending on the severity of the reaction conditions and the catalyst that is selected.

If it desirable that the amphiphilic triblock copolymer forms micelles in various solvents, the hydrophilicity can be controlled by the extent of hydrosilylation and/or the choice of the $R^2$ group in the silyl of formula —$Si(R^1)_y(R^2)_{(3-y)}$. Further, it is often desirable for such applications that the amount of hydrosilylated 1,2-butadiene is at least 50 mole percent, at least 55 mole percent, at least 60 mole percent, at least 65 mole percent, at least 70 mole percent, at least 75 mole percent, at least 80 mole percent, at least 85 mole percent, or at least 90 mole percent and up to 100 mole percent based on total moles of repeat units in the C block. The hydrosilylated 1,2-butadiene are of Formula (IV-A) and/or Formula (IV-B).

The amphiphilic triblock copolymer typically contains 5 to 30 mole percent C block based on total moles of repeat units in the amphiphilic triblock copolymer. The amount can at least 5 mole percent, at least 10 mole percent, at least 15 mole percent, or at least 20 mole percent and up 30 mole percent, up to 25 mole percent, or up to 20 mole percent.

Overall, the amphiphilic triblock copolymer contains 20 to 45 mole percent A block, 40 to 65 mole percent B block, and 5 to 30 mole percent C block based on the total moles of repeat units in the amphiphilic triblock copolymer. In some embodiments, the amphiphilic triblock copolymer contains 25 to 45 mole percent A block, 40 to 60 mole percent B block, and 10 to 30 mole percent C block. In still other embodiments, the amphiphilic triblock copolymer contains 30 to 45 mole percent A block, 40 to 55 mole percent B block, and 10 to 25 mole percent C block. In yet other embodiments, the amphiphilic triblock copolymer contains 30 to 40 mole percent A block, 40 to 55 mole percent B block, and 10 to 25 mole percent C block.

The number average molecular weight for the amphiphilic triblock copolymer is typically in a range of 20,000 Daltons to 500,000 Daltons. The number average molecular weight can be at least 30,000 Daltons, at least 40,000 Daltons, at least 50,000 Daltons, at least 60,000 Daltons, at least 70,000 Daltons, at least 80,000 Daltons, at least 90,000 Daltons, or at least 100,000 Daltons and can go up to 400,000 Daltons, up to 300,000 Daltons or even higher, up to 275,000 Daltons, up to 250,000 Daltons, up to 225,000 Daltons, up to 200,000 Daltons, up to 175,000 Daltons, up to 150,000 Daltons, up to 125,000 Daltons, or up to 100,000 Daltons.

The polydispersity index, which is equal to the weight average molecular weight divided by the number average molecular weight of each block and of the amphiphilic triblock copolymer can be in a range of 1 to 3, in a range of 1 to 2.5, in a range of 1 to 2.0, in a range of 1 to 1.8, in a range of 1 to 1.6 or in a range of 1 to 1.3.

The amphiphilic triblock copolymer is formed from a precursor triblock copolymer. The precursor triblock copolymer contains, a block $A^1$ that contains isoprene repeat units, a block $B^1$ that contains vinyl aromatic repeat units and a block $C^1$ that contains butadiene repeat units. That is, the precursor triblock copolymer contains blocks of polyisoprene, poly (vinyl aromatic), and poly(butadiene). The precursor triblock copolymer does not contain any hydrosilylated groups.

The $A^1$ block in the precursor triblock copolymer corresponds to the A block in the amphiphilic triblock copolymer with the exception that no repeat unit is hydrosilylated. That is, the precursor triblock copolymer contains repeat units of Formula (I-A) and can contain repeat units of Formula (I-B).

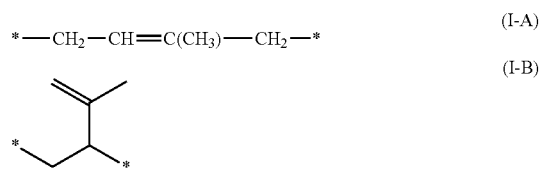

Within the $A^1$ block, at least 90 mole percent of the repeat units are of Formula (I-A). The amount can be at least 92 mole percent, at least 94 mole percent, at least 95 mole percent, at least 96 mole percent, at least 98 mole percent, or at least 99 mole percent and up to 100 mole percent, up to 98 mole percent, up to 96 mole percent, or up to 95 mole percent. The remainder of the repeat units in the $A^1$ block are usually of Formula (I-B). The amounts of repeat units are based on the total moles of repeat units in the $A^1$ block.

Like the amphiphilic triblock copolymer, the precursor triblock copolymer contains 20 to 45 mole percent $A^1$ block based on the total moles of repeat units in the precursor triblock copolymer. The amount can be at least 20 mole percent, at least 25 mole percent, at least 30 mole percent, or at least 35 mole percent and up to 45 mole percent or up to 40 mole percent. The amounts are based on the total moles of repeat units in the precursor triblock copolymer.

The $B^1$ block of the precursor triblock copolymer corresponds to the B block of the amphiphilic triblock copolymer. This block contains repeat units derived from vinyl aromatic monomers. These vinyl aromatic monomers are usually styrene-type monomers of Formula (III-A) and/or Formula (III-B).

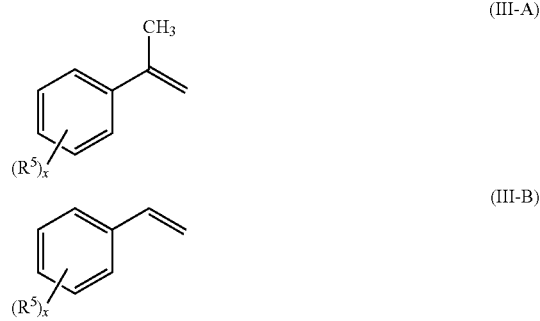

$R^5$ and the variable x are the same as defined above for the B block

Like the B block, the only repeat units in the $B^1$ block are derived from vinyl aromatic monomers. That is, at least 90 mole percent, at least 92 mole percent, at least 95 mole percent, at least 97 mole percent, at least 98 mole percent, at least 99 mole percent and up to 100 mole percent of the B block is derived from vinyl monomers. The repeat units in the $B^1$ block typically do not react when the precursor is hydrosilylated to form the amphiphilic triblock copolymer.

Like the amphiphilic triblock copolymer, 40 to 65 mole percent of the repeat units in the precursor triblock copolymer are in the $B^1$ block. The amount can be at least 40 mole percent, at least 45 mole percent, at least 50 mole percent, or at least 55 mole percent and up to 65 mole percent, up to 60 mole percent, up to 55 mole percent, or up to 50 mole percent. The amounts are based on the total moles of repeat units in the precursor triblock copolymer.

The $C^1$ block of the precursor triblock copolymer corresponds to the C block of the amphiphilic triblock copolymer. Unlike the C block, however, the $C^1$ block does not have any hydrosilylated groups. That is, the $C^1$ block has butadiene repeat units that undergo hydrosilylation to form the C block. The $C^1$ block contains 1,4-butadiene repeat units of Formula (VI) and 1,2-butadiene repeat units of Formula (VII).

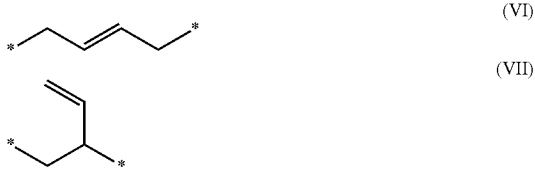

At least 30 mole percent of the repeat units in the $C^1$ block are of Formula (VII). The amount is based on the total moles of repeat units in the $C^1$ block. The $C^1$ block can contain at least 35 mole percent, at least 40 mole percent, at least 45 mole percent, at least 50 mole percent, at least 55 mole percent, at least 60 mole percent, at least 65 mole percent, at least 70 mole percent, at least 75 mole percent, at least 80 mole percent, at least 85 mole percent, at least 90 mole percent or at least 95 mole percent and up to 100 mole percent, up to 95 mole percent, up to 90 mole percent, up to 85 mole percent, up to 80 mole percent, up to 75 mole percent, up to 70 mole percent, up to 65 mole percent, up to 60 mole percent, up to 55 mole percent, or up to 50 mole percent repeat units of Formula (VII). The remainder of the repeat units in the $C^1$ block are typically of Formula (VI).

For forming an amphiphilic triblock copolymer that can form micelles in various solvents, the amount of 1,2-butadiene repeat units is often selected to be at least 70 mole percent based on the total repeat units in the $C^1$ block. For example, the amount of 1,2-butadiene can be at least 75 mole percent, at least 80 mole percent, at least 85 mole percent, at least 90 mole percent, or at least 95 mole percent and up to 100 mole percent based on total moles of repeat units in the $C^1$ block.

The precursor triblock copolymer typically contains 5 to 30 mole percent $C^1$ block based on total moles of repeat units in the precursor triblock copolymer. The amount can be at least 5 mole percent, at least 10 mole percent, at least 15 mole percent, or at least 20 mole percent and up to 30 mole percent, up to 25 mole percent, or up to 20 mole percent.

Overall, the precursor triblock copolymer contains 20 to 45 mole percent $A^1$ block, 40 to 65 mole percent $B^1$ block, and 5 to 30 mole percent $C^1$ block based on the total moles of repeat units in the amphiphilic triblock copolymer. In some embodiments, the precursor triblock copolymer contains 25 to 45 mole percent $A^1$ block, 40 to 60 mole percent $B^1$ block, and 10 to 30 mole percent $C^1$ block. In still other embodiments, the precursor triblock copolymer contains 30 to 45 mole percent $A^1$ block, 40 to 55 mole percent $B^1$ block, and 10 to 25 mole percent $C^1$ block. In yet other embodiments, the precursor triblock copolymer contains 30 to 40 mole percent $A^1$ block, 40 to 55 mole percent $B^1$ block, and 10 to 25 mole percent $C^1$ block.

The precursor triblock copolymer is typically prepared by anionic polymerization processes. Suitable initiators are described in various references such as, for example, in Hsieh et al., *Anionic Polymerization: Principles and Practical Applications*, chapters 5 and 23 (Marcel Dekker, New York, 1996).

In many embodiments, the initiator is an organometallic compound with the metal being selected from lithium, sodium, or potassium and the organic portion being a hydrocarbon. For example, the initiator is often an alkyl or aryl lithium compound, an alkyl or aryl sodium compound, or an alkyl or aryl potassium compound. The number of carbon atoms in the compounds can be up to 20, up to 16, up to 8, up to 6, or up to 4. Examples of such initiators include, for example, benzylsodium, ethylsodium, propylsodium, phenylsodium, butylpotassium, octylpotassium, benzylpotassium, benzyllithium, methyllithium, ethyllithium, propyllithium, n-butyllithium, sec-butyllithium, tert-butyllithium, phenyllithium, and 2-ethylhexyllithium.

The organometallic initiator is often an alkyl or aryl lithium compound. Anionic polymerization methods using the alkyl or aryl lithium compounds are well knows and are described, for example in U.S. Pat. No. 4,039,593 (Kamienski et al.) and U.S. Pat. No. Re. 27,145 (Jones et al.).

The molecular weight of each block within the precursor triblock copolymer can be controlled by the initiator to monomer molar ratio. In many embodiments, the reaction mixture contains 0.0001 to 0.2 moles of organometallic initiator per mole of monomer. The reaction mixture often contains at least 0.0001, at least 0.0005, at least 0.001, at least 0.005, or at least 0.010 and up to 0.1, up to 0.08, up to 0.05, or up to 0.04 moles of organometallic initiator per mole of monomer. For synthesis of the second block, the initiator is a macroanion (e.g., living macroanion) that includes the organometallic initiator and the first block. For synthesis of the third block, the initiator is a macroanion (e.g., living macroanion) that includes the organometallic initiator, the first block and the second block.

Each block is formed separately, and the three blocks can be formed in any desired order. That is, the precursor triblock copolymer can be an $A^1B^1C^1$, $A^1C^1B^1$, or $B^1A^1C^1$ triblock copolymer. In many embodiments, the precursor triblock copolymer is an $A^1B^1C^1$ triblock copolymer. Each block is typically polymerized until at least 80 mole percent, at least 85 mole percent, at least 90 mole percent, at least 95 mole percent, at least 97 mole percent, at least 98 mole percent, or at least 99 mole percent of the monomers have reacted. This results in a triblock copolymer having sharper transition in the composition between two adjacent blocks.

Generally, each polymerization step is carried out at a temperature range from −78° C. to 100° C., preferably from about 0° C. to about 60° C. Anhydrous conditions and an inert atmosphere such as nitrogen, argon, or helium are typically required.

To form well defined diblock copolymers and then triblock copolymers by anionic polymerization methods, certain guidelines are frequently followed to minimize the amount of homopolymers and/or diblock copolymers in the final triblock copolymer. One guideline is that the carbanion derived from second monomer used to form the second block (i.e, the living second macroanion) is preferably more stable than the one derived from the first monomer used to form the first block (i.e., the living first macroanion). That is, the first macroanion must be a stronger nucleophile (more basic) that the second macroanion. This same relationship applies between the carbanion derived from the third monomer (i.e., the living third macroanion) and that derived from the second monomer.

Another guideline is that the initiation of polymerization of the second monomer by the living first macroanion derived from the first monomer is preferably higher than the rate of propagation of the second monomer. This facilitates formation of a second block having a narrow molecular weight distribution and diminishes the likelihood a homopolymer derived from only the first monomer in the final product. This same relationship applies to the third monomer and the living second macroanion (derived from the first monomer plus the second monomer).

Yet another guideline is that the purity of the second monomer preferably is high. Otherwise, partial termination of the living first macroanion can occur leading to the presence of a homopolymer derived from the first monomer. Likewise, the purity of the third monomer preferably is high. Otherwise, partial termination of the living second macroanion can occur leading to the presence of a diblock copolymer having one block derived from the first monomer and another block derived from the second monomer.

The number average molecular weight for the precursor triblock copolymer is typically in a range of 20,000 Daltons to 500,000 Daltons. The number average molecular weight can be at least 30,000 Daltons, at least 40,000 Daltons, at least 50,000 Daltons, at least 60,000 Daltons, at least 70,000 Daltons, at least 80,000 Daltons, at least 90,000 Daltons, or at least 100,000 Daltons and can go up to 400,000 Daltons, up to 300,000 Daltons or even higher, up to 275,000 Daltons, up to 250,000 Daltons, up to 225,000 Daltons, up to 200,000 Daltons, up to 175,000 Daltons, up to 150,000 Daltons, up to 125,000 Daltons, or up to 100,000 Daltons. The number average molecular weight is measured using gel permeation chromatography.

The polydispersity index, which is equal to the weight average molecular weight divided by the number average molecular weight of each block and of the overall precursor triblock copolymer can be in a range of 1 to 3, in a range of 1 to 2.5, in a range of 1 to 2.0, in a range of 1 to 1.8, in a range of 1 to 1.6 or in a range of 1 to 1.3. Both the number average molecular weight and the weight average molecular weights are measured using gel permeation chromatography.

The precursor triblock copolymer is subjected to hydrosilylation to form the amphiphilic triblock copolymer. This is typically a two-step process. Initially, the precursor triblock copolymer is reacted with a halogenated silane of Formula (VIII).

(VIII)

In Formula (VIII), $R^1$ is an alkyl or aryl, X is a halo such as chloro or bromo, and the variable y is an integer equal to 1 or 2. The halogenated silane reacts predominately with the 1,2-butadiene repeat units of Formula (VII) in the $C^1$ block of the precursor triblock copolymer.

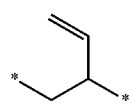
(VII)

Depending on the severity of the reaction conditions and the catalyst selected, the halogenated silane can also react with 1,4-butadiene repeat units of Formula (VI)

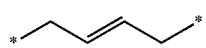
(VI)

and with the isoprene repeat units of Formula (I-A) and Formula (I-B).

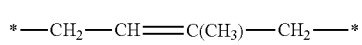
(I-A)

(I-B)

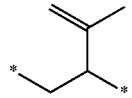

Some hydrosilylation of the A block is acceptable provided that the C and A blocks in the final amphiphilic triblock have sufficiently different solubility. That is, the hydrosilylation conditions including reaction time, temperature, and extent of conversion should be selected to provide C and A blocks that are not miscible with each other.

The intermediate formed by treating the precursor triblock copolymer with the halogenated silane of Formula (VIII) results in the formation of repeat units of Formula (IX-A) and Formula (IX-B) in the polybutadiene block resulting from the hydrosilylation of the 1,2-butadiene repeat units.

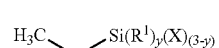
(IX-A)

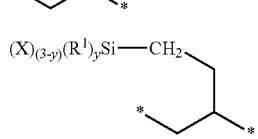
(IX-B)

In Formula (IX-A) and (IX-B), $R^1$ is an alkyl or aryl, X is a halo such as chloro or bromo, and the variable y is an integer equal to 1 or 2.

This first step of the hydrosilylation process occurs in the presence of a catalyst. Any suitable catalyst can be used. The catalyst can be selected, for example, to be an organometallic compound such as those with platinum or rhodium as the metal. Example platinum-containing catalysts include hexachloroplatinate ($H_2PtCl_6$) and Karstedt's catalyst, which refers to a platinum divinyl(tetramethyl)siloxane complex. Example rhodium-containing catalysts include Wilkinson's catalyst, which is tris(triphenylphosphine)rhodium(I) chloride (($PPh_3$)$_3$RhCl).

The intermediate is further reacted with a compound of Formula (X) in the presence of a base such as, for example, aniline, triethylamine, or pyridine.

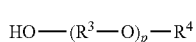
(X)

In Formula (X), group $R^3$ is an alkylene, and group $R^4$ is an alkyl. The variable p is an integer in a range of 0 to 20. The product of this reaction is hydrosilylated 1,2-butadiene repeat units of Formula (IV-A) and Formula (IV-B) in the resulting amphiphilic block copolymer.

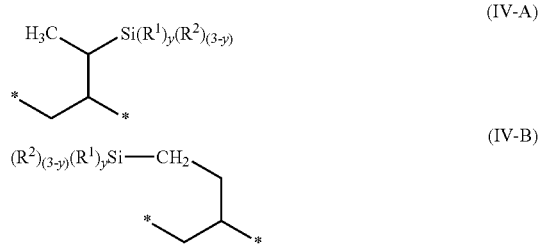

(IV-A)

(IV-B)

In Formulas (IV-A) and (IV-B), group $R^1$ is an alkyl or aryl, group $R^2$ is of formula $-O-(R^3-O)_p-R^4$, group $R^3$ is an alkylene, and group $R^4$ is an alkyl. The variable y is an integer equal to 1 or 2 and the variable p is an integer in a range of 0 to 20. An asterisk (*) indicates a binding site to another repeat unit or to another group (e.g., a terminal group) of the triblock copolymer.

The three blocks of the resulting amphiphilic block copolymer should not be miscible with each other. That is, the blocks should be immiscible with each other. Immiscibility refers to either limited or no solubility and non-zero interfacial tension. That is, a blend of homopolymers of each block would having a free energy of mixing that is greater than zero ($\Delta G \cong \Delta Hm > 0$). Solubility parameters can be used to evaluate miscibility of various polymeric materials. Alternatively, electron micrographic methods can be used to evaluate miscibility.

The amphiphilic triblock copolymer can be in the form of micelles and/or aggregates having an average diameter of at least 40 nanometers when dissolved in solvent mixtures such as, for example, NMP/THF or DMAc/THF containing greater than 50 volume percent THF. The average diameter can be at least 20 nanometers, at least 30 nanometers, at least 40 nanometers or at least 50 nanometers. The average diameter can be determined using Dynamic Light Scattering. In some embodiments, the size distribution obtained from Dynamic Light Scattering suggests that there are both micelles and aggregates present when the amphiphilic triblock copolymer is dissolved in a solvent mixture of NMP/THF or DMA/THF. The diameters of the free chains are often in a range of about 10 to about 100 nanometers. The diameters of the micelles are often in a range of about 40 to about 500 nanometers. The diameters of the aggregates are often in a range of about 400 to about 2000 nanometers. These ranges can overlap depending on the selection of solvents and solvent ratios.

The amphiphilic triblock copolymer can be used for any desired purpose. For example, it can be used in various articles such as porous membranes and water-tight sealing gaskets or 0-rings. Further, the amphiphilic triblock copolymers can be used as emulsifiers in various composites such as those that include clay particles. Still further, the amphiphilic triblock copolymers can be used to modify a hydrophobic surface to be a hydrophilic surface.

Porous membranes can be formed that contain the amphiphilic triblock copolymers. Porous membranes can be used, for example, as size-exclusion filters in a variety of applications including water treatment, food and beverage preparation, and medical/biopharmaceutical preparation.

In addition to the amphiphilic triblock copolymers, the porous membranes can contain polymeric materials other than the amphiphilic triblock copolymers. In some embodiments, these other polymeric materials may be homopolymers and/or diblock copolymers. The homopolymer may be of the same composition of any A block, B block, or C block in the amphiphilic triblock copolymer. The diblock copolymers can be of the same composition of any two of the blocks in the amphiphilic triblock copolymer.

The porous membranes can be formed in any suitable manner. In some embodiments, the porous membrane can be formed using solvent induced phase separation (SIPS) methods. Such methods can include forming or obtaining a triblock copolymer solution, which is the amphiphilic triblock copolymer dissolved in a solvent system. The methods can further include forming an intermediate article from the triblock copolymer solution and removing at least a portion of the solvent system to form a partially dried intermediate article. The methods yet further can include contacting the partially dried intermediate article with a nonsolvent to form a porous membrane that contains the amphiphilic triblock copolymer. Various process parameters related to these steps can be altered to obtain the desired properties of the porous membrane.

The triblock copolymer solution is often prepared by dissolving the amphiphilic triblock copolymer in a solvent system, which can be a single solvent or a mixture of solvents such as a binary mixture or even a ternary mixture. The solvent system can generally be selected so that the triblock copolymer solution is clear or only slightly hazy and the amphiphilic triblock copolymer is completely dissolved based on visual inspection. Illustrative solvent systems often contain two or more solvents selected, for example, from acetone, methyl ethyl ketone (MEK), dimethylformamide (DMF), dimethylacetamide (DMAc), 1,4-dioxane, diglyme, tetrahydrofuran (THF), and N-methylpyrrolidone (NMP). The amounts and identities of the individual solvents can be varied to provide the desired membrane properties. In some illustrative embodiments, useful solvent systems can include a mixture of THF and NMP or THF and DMAc. For example, the solvent systems can be a mixture of 20 to 80 weight percent THF and 20 to 80 weight percent of another solvent such as NMP or DMAc based on the total weight of the solvent system.

The amount of the amphiphilic triblock copolymer dissolved in the triblock copolymer solution also can be varied to provide the desired properties. Generally, useful triblock copolymer solutions contain at least 10 to 25 weight percent of the amphiphilic triblock copolymer. For example, the amount can be at least 10 weight percent, at least 15 weight percent, or at least 20 weight percent and up to 25 weight percent, up to 20 weight percent, or up to 15 weight percent.

The step of forming the intermediate article can be accomplished using many different processes. Illustrative intermediate articles can include films/sheets, hollow fibers/capillaries, and tubes. Film type intermediate articles can be formed using any known methods of forming a film or layer from a liquid. Illustrative methods include casting the triblock copolymer solution into a film or spin coating the solution into a film. Films can be casted on a substrate of some kind such as a roll or flat substrate or can be formed as a free-standing film, for example, on a temperature-controlled roller using a notch bar coater, a knife coater, or the like. Films can be spin coated onto any suitable substrate. Film type intermediate articles can have any desired thickness. In some embodiments, the films have a thickness in a range of 1 to 15 mil micrometers, which corresponds to about 25 to 375 micrometers.

After formation of the intermediate article, at least a portion of the solvent system is removed to form the partially dried intermediate article. The solvent system can be removed by allowing some portion thereof to evaporate (which may remove more of one solvent than the other(s)) under room temperature conditions, elevated temperature conditions, elevated air flow conditions, decreased pressure conditions, or any combination thereof, for example. In some illustrative embodiments, the solvent system can be allowed to evaporate for not greater than a minute (in some embodiments, not greater than 45 seconds, 40 seconds, 35 seconds, 30 seconds, 25 seconds, or even not greater than 20 seconds). The removed portion of the solvent system can also be removed by contacting the surface of the intermediate article with a liquid in which the removed portion of the solvent system is soluble and then removing that secondary liquid (made up of the liquid and a portion of the solvent system) from the surface of the precursor article. The amount of the solvent system removed, the relative amounts of the solvent(s) in the solvent system removed, or a combination thereof can be varied to provide desired properties.

After partially drying, the next step usually includes contacting the partially dried intermediate article with a non-solvent composition. A non-solvent refers to at least one solvent that does not dissolve the amphiphilic triblock copolymer. That is, the amphiphilic triblock copolymer is substantially insolvent in the non-solvent composition and there is a phase separation between the amphiphilic triblock copolymer and non-solvent composition. If the non-solvent composition includes more than one solvent, these solvents can be at least partially miscible with each other and up to fully miscible with each other. Illustrative non-solvents can include, for example, combinations selected from water, alcohols (e.g., methanol, ethanol or isopropanol), DPM glycol ether (available, for example, under the trade designation "DOWANOL" from the Dow Chemical Company, Midland, MI), pentanes, and mixtures thereof. The choice of the non-solvent, the concentration of each solvent in the non-solvent composition, additives such as salts in the non-solvent composition, the time the partially dried intermediate article is exposed to the nonsolvent, the temperature of the nonsolvent, or combinations thereof can be varied to provide desired properties.

The porous membrane can have pores having an average pore size (average diameter) in a range of 1 to 500 nanometers. For example, the average pore size can be at least 2 nanometers, at least 5 nanometers, at least 10 nanometers, at least 20 nanometers, at least 40 nanometers, at least 50 nanometers, or at least 100 nanometers and up to 500 nanometers, up to 400 nanometers, up to 300 nanometers, up to 200 nanometers, up to 100 nanometers, or up to 50 nanometers. The average size can be determined based on analysis of the pores visible in electron or atomic force micrographs. The membrane can be symmetrical (having uniform average pore size though the thickness of the membrane) or asymmetrical (having non-uniform average pore size through the thickness of the membrane).

The porous membrane can be free-standing or disposed on a substrate. The free-standing membrane can be flat sheet or a hollow fiber. Suitable substrates include, for example, another porous layer such a polymeric membranes, nonwoven substrates, porous ceramic substrates, and porous metal substrates. Optionally, the porous membrane substrate comprises a hollow fiber membrane. The porous membrane may be either symmetric or asymmetric, for instance depending on a desired application. In addition, the smallest pores can be located at one surface, the other surface, both surfaces, or at any point through the thickness of the porous membrane.

The porous membranes can have dry thicknesses from in a range from 0.5 to 500 micrometers, for example. Illustrative freestanding membranes can have dry thicknesses in a range from 25 micrometers to 150 micrometers. Illustrative membranes cast onto a support can have dry thicknesses in a range from 0.5 micrometers to 150 micrometers.

The porous membranes can be utilized in numerous and varied applications. For example, the porous membranes can be utilized as a filter or part of a filter. Illustrative filters can be configured to be coupled with an element that supports the filter (i.e., a filter support). A filter support can function to maintain the filter in operable communication with a receptacle. Illustrative filter supports can provide support across substantially the entire surface area of the filter or less than the entire surface area of the filter. The combination of the filter, the receptacle and the filter support can be referred to as a filter assembly.

Various embodiments are provided that include an amphiphilic triblock copolymer, a method of making the amphiphilic triblock copolymer, and an article containing the amphiphilic triblock copolymer.

Embodiment 1A is an amphiphilic triblock copolymer that contains 20 to 45 mole percent A block, 40 to 65 mole percent B block, and 5 to 30 mole percent C blocks based on total moles of repeat units in the amphiphilic triblock copolymer. The A block comprises poly(isoprene) and greater than 90 mole percent of the repeat units in the A block are of Formula (I-A).

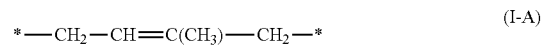

The B block comprises a poly(vinyl aromatic). Greater than 30 mole percent of the repeat units in the C block are hydrosilylated 1,2-butadiene repeat units of Formula (IV-A) or Formula (IV-B).

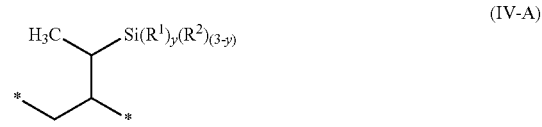

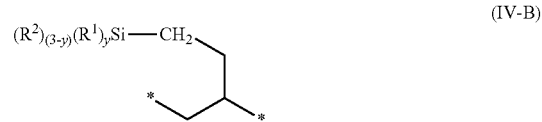

In Formulas (IV-A) and (IV-B), $R^1$ is an alkyl or aryl and $R^2$ is a group of formula $-O-(R^3-O)_p-R^4$. Group $R^3$ is an alkylene and $R^4$ is an alkyl. The variable y is an integer equal to 1 or 2 and the variable p is an integer in a range of 0 to 20. An asterisk (*) indicates a binding site to another repeat unit or terminal group of the triblock copolymer.

Embodiment 2A is the amphiphilic triblock copolymer of embodiment 1A, wherein the A block further comprises optional repeat units of Formula (I-B)

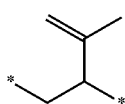

(I-B)

in an amount in a range of 0 to 10 mole percent based on total moles of repeat units in the B block.

Embodiment 3A is the amphiphilic triblock copolymer of embodiment 1A or 2A, wherein the A block contains less than 5 mole percent repeat units of Formula (II)

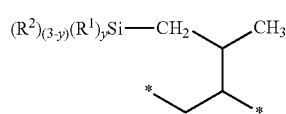

(II)

where $R^1$ is an alkyl or aryl and $R^2$ is a group of formula $-O-(R^3-O)_p-R^4$. Group $R^3$ is an alkylene and $R^4$ is an alkyl. The variable y is an integer equal to 1 or 2 and the variable p is an integer in a range of 0 to 20.

Embodiment 4A is the amphiphilic triblock copolymer of any one of embodiments 1A to 3A, wherein the poly(vinyl aromatic) B block comprises repeat units derived from styrene-type monomers of Formula (III-A) or (III-B).

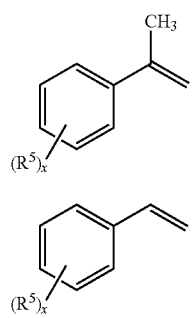

(III-A)

(III-B)

The group $R^5$ is an alkyl and the variable x is an integer in a range from 0 to 3.

Embodiment 5A is the amphiphilic triblock copolymer of any one of embodiments 1A to 4A, wherein the B block has a glass transition temperature of at least 90° C. when measured using differential scanning calorimetry.

Embodiment 6A is the amphiphilic triblock copolymer of any one of embodiments 1A to 5A, wherein a ratio of the mole percent of repeat units in the B block in the amphiphilic triblock copolymer to the mole percent of repeat units in the A block in the amphiphilic triblock copolymer is in a range of 3:1 to 1:1.

Embodiment 7A is the amphiphilic triblock copolymer of any one of embodiments 1A to 6A, wherein the mole percent of repeat units in the A block plus the mole percent of repeat units in the B block is in a range of 70 to 95 mole percent based on total moles of repeat units in the amphiphilic triblock copolymer.

Embodiment 8A is the amphiphilic triblock copolymer of any one of embodiments 1A to 7A, wherein the C block comprises at least 40 mole percent repeat units of Formula (IV-A) and/or Formula (IV-B).

Embodiment 9A is the amphiphilic triblock copolymer of any one of embodiments 1A to 8A, wherein the C block comprises at least 60 mole percent repeat units of Formula (IV-A) and/or Formula (IV-B).

Embodiment 10A is the amphiphilic triblock copolymer of any one of embodiments 1A to 9A, wherein the C block comprises at least 70 mole percent repeat units of Formula (IV-A) and/or Formula (IV-B).

Embodiment 11A is the amphiphilic triblock copolymer of any one of embodiments 1A to 10A, wherein the C block comprises at least 90 mole percent repeat units of Formula (IV-A) and/or Formula (IV-B).

Embodiment 12A is the amphiphilic triblock copolymer of any one of embodiments 1A to 11A, wherein the C block optionally comprises one or more repeat units selected from or more of Formula (V), Formula (VI), and Formula (VII)

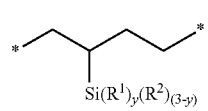

(V)

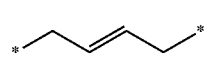

(VI)

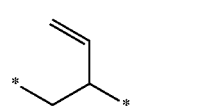

(VII)

wherein $R^1$, $R^2$, and the variable y are the same as defined for Formula (IV-A) and Formula (IV-B).

Embodiment 13A is the amphiphilic triblock copolymer of embodiment 12A, wherein the C block comprises 30 to 100 mole percent repeat units of Formula (IV-A) and/or Formula (IV-B) and 0 to 70 mole percent repeat units selected from one or more of Formula (V), Formula (VI), and Formula (VII).

Embodiment 14A is the amphiphilic triblock copolymer of embodiment 12A or 13A, wherein the C block comprises 70 to 100 mole percent repeat units of Formula (IV-A) and/or Formula (IV-B) and 0 to 30 mole percent repeat units selected from one or more of Formula (V), Formula (VI), and Formula (VII).

Embodiment 15A is the amphiphilic triblock copolymer of embodiment 13A or 14A, wherein the C block comprises 90 to 100 mole percent repeat units of Formula (IV-A) and/or Formula (IV-B) and 0 to 10 mole percent repeat units selected from one or more of Formula (V), Formula (VI), and Formula (VII).

Embodiment 16A is the amphiphilic triblock copolymer of any one of embodiments 1A to 15A, wherein the amphiphilic triblock copolymer has a number average molecular weight in a range of 20,000 to 500,000 Daltons.

Embodiment 17A is the amphiphilic triblock copolymer of any one of embodiments 1A to 16A, wherein the polydispersity is in a range of 1 to 1.6.

Embodiment 18A is the amphiphilic triblock copolymer of any one of embodiments 1A to 17A, wherein the amphiphilic triblock copolymer forms micelles when dissolved in a solvent system containing 20 to 80 volume percent THF and 20 to 80 volume percent NMP or DMAc.

Embodiment 19A is the amphiphilic triblock copolymer of any one of embodiments 1A to 18A, wherein the amphiphilic triblock copolymer is an ABC triblock copolymer.

Embodiment 1B is an article comprising the amphiphilic triblock copolymer of embodiment 1A.

Embodiment 2B is that article of embodiment 1B wherein the article comprises the amphiphilic triblock copolymer of any one of embodiments 2A to 19A Embodiment 3B is the article of embodiment of 1B or 2B, wherein the article is a porous membrane.

Embodiment 4B is the article of embodiment 3B, wherein the porous membrane further comprises a homopolymer having the same composition as the A block, B block, C block or a mixture thereof and/or a diblock copolymer comprising an A block and a B block, an A block and a C block, a B block and a C block, or a mixture thereof.

Embodiment 5B is the article of embodiment 3B or 4B, wherein the porous membrane has pores with an average size (average diameter) of 1 to 500 nanometers.

Embodiment 6B is the article of embodiment 5B, wherein the porous membrane is prepared using solvent induced phase separation (SIPS) methods.

Embodiment 7B is the article of embodiment 6B, wherein the porous membrane has asymmetric pores (non-uniform average pore size (e.g., diameter) through the thickness of the membrane).

Embodiment 1C is a method of forming an amphiphilic triblock copolymer. The method includes providing or obtaining a triblock precursor copolymer that contains 20 to 45 mole percent $A^1$ block, 40 to 65 mole percent $B^1$ block, and 5 to 30 mole percent $C^1$ blocks based on total moles of repeat units in the precursor triblock copolymer. The $A^1$ block comprises poly(isoprene) and greater than 90 mole percent of the repeat units in the A block are of Formula (I-A).

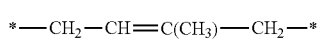
(I-A)

The $B^1$ block comprises a poly(vinyl aromatic) and greater than 30 mole percent of the repeat units in the $C^1$ block are 1,2-butadiene repeat units of Formula (VII).

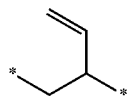
(VII)

The method further includes reacting the 1,2-butadiene repeat units in the $C^1$ block of the precursor triblock copolymer with a halogenated silane of Formula (VIII)

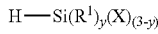
(VIII)

in the presence of an organometallic catalyst to form a halogenated intermediate triblock copolymer having repeat units of Formula (IX-A) and Formula (IX-B).

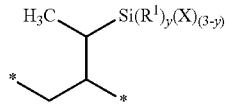
(IX-A)

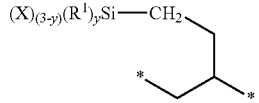
(IX-B)

In Formula (IX-A) and Formula (IX-B), group $R^1$ is an alkyl or aryl, X is a halo, and the variable y is an integer equal to 1 or 2. The method still further includes treating the intermediate triblock copolymer with a compound of Formula (X)

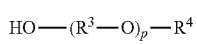
(X)

to form the amphiphilic triblock copolymer having a C block comprising repeat units of Formula (IV-A) and Formula (IV-B).

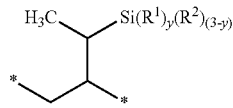
(IV-A)

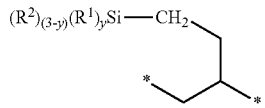
(IV-B)

wherein $R^2$ is a group of formula $-O-(R^3-O)_p-R^4$, group $R^3$ is an alkylene, and group $R^4$ is an alkyl. The variable p is an integer in a range of 0 to 20 and an asterisk (*) indicates a binding site to another repeat unit or terminal group of the precursor triblock copolymer, halogenated intermediate triblock copolymer, or amphiphilic triblock copolymer.

Embodiment 2C is the method of embodiment 1C, wherein the amphiphilic triblock copolymer is any one of embodiments 1A to 19A.

Embodiment 3C is the method of embodiment 1C or 2C, wherein the organometallic catalyst comprises an platinum-containing compound or a rhodium-containing compound.

EXAMPLES

Advantages and embodiments of this disclosure are further illustrated by the following examples, but the specific materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; St. Louis, MO, USA or Alfa Aesar; Ward Hill, MA, USA, or known to those skilled in the art unless otherwise stated or apparent.

Foreseeable modifications and alterations of this invention will be apparent to those skilled in the art without departing from the scope and spirit of this invention. This invention should not be restricted to the embodiments that are set forth in this application for illustrative purposes.

TABLE 1

Materials Used in the Examples

| ABBREVIATION | DESCRIPTION | SOURCE |
|---|---|---|
| Karstedt's Catalyst | Platinum (0)-1,3-divinyl-1,1,3,3 tetramethyldisiloxane complex solution in xylene (Pt approximately 2 weight percent) | Gelest Inc., Morrisville, PA, USA |
| Isoprene | L14619 | Alfa Aesar, Ward Hill, MA, USA |
| Styrene | Reagent plus, greater than 99 percent purity | Sigma-Aldrich Co. LLC., St. Louis, MO, USA |
| 1,3-Butadiene | Greater than 99 percent purity | Sigma-Aldrich Co. LLC |
| Sec-BuLi | 12 weight percent sec-butyllithium in cyclohexane | FMC Lithium, Bellevue, WA, USA |
| $Me_2ClSiH$ | Chlorodimethylsilane, 98 percent purity | Sigma-Aldrich Co. LLC |
| $MeCl_2SiH$ | Dichloromethylsilane | Sigma-Aldrich Co. LLC |
| Dipip | 1,2-Dipiperidinoethane | Sigma-Aldrich Co. LLC |
| Aniline | Greater than 99 percent purity | Alfa Aesar |
| 2-methoxyethanol | 99 percent purity | Alfa Aesar |
| THF | Tetrahydrofuran, anhydrous, Greater than or equal to 99.9 percent purity, inhibitor-free | Sigma-Aldrich Co. LLC |
| DCM | Dichloromethane, high purity obtained under the trade designation OMNISOLV | EMD Millipore, Burlington, MA, USA |
| IPA | Isopropanol | VWR International, Batavia, IL, USA |
| Ethanol | Denatured ethyl alcohol, pure, anhydrous, greater than 99.5 percent purity | Sigma-Aldrich Co. LLC |
| Methanol | Methanol (MeOH), high purity obtained under the trade designation OMNISOLV | EMD Millipore |
| Basic alumina | Aluminum oxide, activated, basic | Sigma-Aldrich Co. LLC |
| Diatomaceous earth | Obtained under the trade designation CELITE 545 | EMD Millipore |
| NMP | 1-methyl-2-pyrrolidinone, greater than 99.0 percent purity | Alfa Aesar |
| THF | Tetrahydrofuran, high purity obtained under the trade designation OMNISOLV | EMD Millipore |
| Acetone | Acetone, high purity obtained under the trade designation OMNISOLV | EMD Millipore |
| DMAc | N,N-dimethylacetamide, 99 percent purity | Alfa Aesar |
| MEK | 2-butanone, 99 percent purity | Alfa Aesar |
| $CaH_2$ | Calcium hydride | Sigma-Aldrich Co. LLC |
| Dibutyl-magnesium | Di-n-butylmagnesium solution, 1.0M in heptane | Sigma-Aldrich Co. LLC |
| n-butyllithium | n-butyllithium solution, 1.6M in hexanes | Sigma-Aldrich Co. LLC |
| 1,1-diphenylethylene | 1,1-diphenylethylene, 97 percent purity | Sigma-Aldrich Co. LLC |
| Benzene | BX0212-6, obtained under the trade designation OMNISOLV | EMD Millipore |

Materials Preparation and Test Methods

Polymer synthesis and reagent manipulations were conducted in a MBraun Labmaster SP glovebox (MBraun Inc., Stratham, NH, USA) or in custom glassware designed to enable anionic polymerizations (for example, see Ndoni et al., Laboratory-scale Setup for Anionic Polymerization under Inert Atmosphere, *Review of Scientific Instruments*, 66(2), 1090-1095 (1995)). Standard air-free techniques were used for reagent manipulations.

Benzene was degassed by bubbling with argon (Ar) gas for longer than one hour before being cannula-transferred to a Strauss flask containing degassed 1,1-diphenylethylene.

Sec-BuLi was then added under Ar counterflow via syringe, causing a very gradual color change from light yellow to deep, wine red over the course of an hour.

Styrene was stirred over calcium hydride ($CaH_2$) overnight, degassed with three freeze-pump-thaw cycles, and then vacuum-transferred into a Schlenk bomb containing dried dibutyl-magnesium. After stirring overnight in an Ar atmosphere, styrene was again vacuum-transferred into a receiving flask to afford a final, dry monomer.

Isoprene was dried as detailed for styrene, with sequential vacuum transfers from $CaH_2$ and dibutyl-magnesium.

Butadiene was condensed in a flask containing n-butyllithium (solvent removed in vacuo) cooled in liquid nitrogen, thawed in an ice water bath at 0° C. and stirred for 30 minutes, vacuum transferred to a second flask containing n-butyllithium (solvent removed in vacuo) and stirred for an additional 30 minutes at 0° C. before collecting the purified monomer in a flask by vacuum transfer.

1,2-Dipiperidinoethane was purified initially with $CaH_2$ followed by purification with sodium mirrors (since it is very hydroscopic) and afterwards, it was dissolved in benzene until proper concentration for the experiments was accomplished.

All other chemicals were used as received.

Gel Permeation Chromatography (GPC)

The GPC equipment included a 1260 Infinity LC (containing a quaternary pump, autosampler, column compartment, and diode array detector) from Agilent Technologies (Santa Clara, CA, USA) operated at a flow rate of 1.0 milliliters per minute (mL/min). The GPC column set contained a PLgel MIXED-A column (300 millimeters (mm) length×7.5 mm internal diameter) plus a PLgel MIXED-B column (300 mm length×7.5 mm internal diameter), both from Agilent Technologies. The detection included a DAWN HELEOS II 18 angle light scattering detector, a VISCOSTAR viscometer, and an OPTILAB T-rEX differential refractive index detector, all three from Wyatt Technology Corporation (Santa Barbara, CA, USA). Data were collected and analyzed using software ASTRA version 6 from Wyatt Technology Corporation. The column compartment, viscometer and differential refractive index detector were set to 40° C. The solvent and eluent (or mobile phase) included OMNISOLV grade tetrahydrofuran (stabilized with 250 parts per million of butylated hydroxytoluene) modified with 5 percent (volume/volume) triethylamine (both from EMD Millipore Corporation, Burlington, MA, USA). The weight average molecular weight, the number average molecular weight, and the polydispersity index can be calculated.

Nuclear Magnetic Resonance (NMR)

A portion of the polymer sample was analyzed as a solution of unknown concentration (generally approximately 12 milligrams per milliliter (mg/mL)) in deuterated chloroform ($CDCl_3$). NMR spectra were acquired on a Bruker AVANCE 600 MHz NMR spectrometer (Billerica, MA, USA) equipped with an inverse cryoprobe.

DSC—Differential Scanning Calorimetry

The glass transition temperature was measured using a TA INSTRUMENTS DIFFERENTIAL SCANNING CALORIMETER according to ASTM D3418-12, unless specified otherwise. Each sample (4 to 8 milligrams (mg)) was heated from –60° C. to 200° C. at 10° C./min in a first heating scan and held for 2 minutes to erase its thermal history, then cooled to –60° C. at 10° C./min in a first cooling scan, and then heated to 200° C. at 10° C./min in a second heating scan. The second heating scan was used to determine the glass transition temperatures (Tg) of the block copolymers. The Tg is determined at the midpoint temperature of the second heating scan, described as $T_{mg}$ in ASTM D3418-12.

Dynamic Light Scattering

Dynamic light scattering (DLS) was performed using a Malvern Zetasizer (Malvern Analytical, Westborough, MA, USA). Solutions for DLS were prepared at 0.1 wt-% polymer in approximately 4 to 5 mL THF, NMP, MEK, DMAc, acetone, or 50/50 mixtures thereof and allowed to sit at least 12 hours at a temperature greater than 40° C. to dissolve. The solutions were filtered through a 0.22 or 0.45 micrometer (um) polypropylene (PP) syringe filter into a quartz cuvette for measurement. Measurements were taken at 25° C. after the sample had equilibrated for 2 minutes in the holder. The instrument software automatically optimized the measurement settings at 1730 through adjustment of the measurement position and attenuator. Fitting was done using the pure solvent as the dispersant in the case of single solvent systems, or as 50/50 mixtures in the case of solvent pairs.

Atomic Force Microscopy (AFM) Imaging

Tapping Mode: In Tapping Mode AFM, the tip/cantilever assembly is oscillated at the resonant frequency of the cantilever; the amplitude of vertical oscillation is the input parameter for the feedback loop. In a topographic AFM image, "brighter regions" correspond to peaks while "darker regions" correspond to valleys. The phase data is the phase difference between the photodiode output signal and driving excitation signal and is a map of how the phase of the AFM cantilever oscillation is affected by its interaction with the surface. The physical meaning of the phase signal is complex and contrast is generally influenced by material property differences such as composition, adhesion, viscoelasticity and may also include topographical contributions. Tapping Mode imaging was performed using either a Bruker's Dimension ICON AFM or a Bruker's Dimension FastScan AFM with a Nanoscope V Controller and Nanoscope 8.15 software. Tapping Mode AFM probes used are FastScan A ($f_0$=1.4 MHz, k=18 N/m, tip radius (nom)=5 nm) and OTESPA $R^3$ ($f_0$=300 kHz, k=26 N/m, tip radius (nom)=7 nm). The tapping setpoint is typically 85% of the free air amplitude.

Peak Force Tapping Mode: Peak Force Tapping is similar Tapping Mode where the tip contacts the sample intermittently, but this mode differs in that operates in a non-resonant mode; the cantilever is driven to oscillation at a fixed frequency (2 kHz modulation in z) and a fast force curve is performed at each pixel of an AFM image. The feedback mechanism in Peak Force Tapping uses the "peak force" setpoint or maximum force sensed by the tip as it contacts the surface. Peak Force Tapping Mode imaging was performed using either a Bruker's Dimension ICON AFM or a Bruker's Dimension FastScan AFM with a Nanoscope V Controller and Nanoscope 8.15 software. Peak Force Tapping Mode was performed using ScanAsyst-Air Probes ($f_0$=70 kHz, k=0.4 N/m, tip radius (nom)=5 nm). Peak Force Tapping setpoint is typically 1nN or lower.

Nanoscope Analysis Software 1.80 or SPIP 6.7.7 software was used for image processing and analysis. Generally, images were applied with a first order planefit (to remove sample tilt) and with 0th order flatten (to remove z-offsets or horizontal skip artifacts). In some cases, to enhance visualization of features, the images were processed with a 3rd order planefit (removes tilt and bow in image) or applied with an L-filter to remove background waviness.

Preparatory Examples

PE1: Synthesis of PI-b-PS-b-$PB_{1,2}$ Triblock Terpolymer

Polymerization of isoprene, followed by that of styrene, and then that of butadiene are the three basic steps for the synthesis of the final linear triblock terpolymer via anionic polymerization and high vacuum techniques.

In a 2000 mL glass apparatus, the polyisoprene (PI) living polymeric chain [$PI^{(-)}Li^{(+)}$] was synthesized by polymerizing 9.0 grams (g) of isoprene (0.13 mole (mol)) with sec-BuLi ($2\times10^{-4}$ mol) in 1200 mL of benzene at room temperature for 24 hours. The molecular weight of the first block (PI) was measured using GPC (gel permeation chromatography) leading to a value of $M_n$ (number average molecular weight) approximately equal to 43 kg/mol and a molecular weight distribution of 1.03. The molecular weight distribution refers to the polydispersity index, which is equal to the weight average molecular weight divided by the number average molecular weight.

To increase the initiation rate of the styrene (second monomer) towards the $PI^{(-)}Li^{(+)}$ macroanion for the ABC triblock terpolymers, a small amount of THF (1-2 mL) was added leading to a very fast initiation step, and the narrow distribution of the intermediate diblock product was ensured. Afterwards, 18.0 g of styrene (0.17 mol) were added and allowed to react for 24 hours at room temperature. The total molecular weight of the diblock copolymer (PI-b-PS) was measured using GPC leading to a value of number average molecular weight ($M_n$) approximately equal to of 128 kg/mol and a molecular weight distribution of 1.04.

Then, 3 mL of 1,2-dipiperidinoethane ($4 \times 10^{-4}$ mol) diluted in benzene were added in the PI-b-PS$^{(-)}$Li$^{(+)}$ solution and the solution was left under stirring for 1 hour to alter the polarity. The molar ratio between the initial initiator (i.e., sec-BuLi) concentration and that of the dipip was approximately 1:2. Finally, 3.0 grams (0.055 mol) of 1,3-butadiene were added and allowed to react for 24 hours at 4° C. to better control the polymerization reaction. This procedure under the specific conditions described (concentration, temperature, solvent mixture) drives the reaction kinetics towards almost 100 mole percent 1,2-butadiene repeat unit addition and not the usual 92 mole percent 1,4-butadiene repeat units and 8 mole percent 1,2-butadiene repeat units, which would be obtained without polar additives during anionic polymerization. The total molecular weight of the final triblock terpolymer (PI-b-PS-b-PB$_{1,2}$) was measured using GPC leading to a value of number average molecular weight ($M_n$) approximately equal to 142 kg/mol and a polydispersity index of 1.07.

The final triblock terpolymer ABC (approximately 27 grams) was precipitated in excess methanol, the precipitated final product was dried in a vacuum oven at 50° C. for 48 hours. After the polymerization of each monomer, a small amount (approximately 1 gram) was always removed from the apparatus for characterization via GPC. The 100 mole percent 1,2-butadiene repeat unit microstructure in the polybutadiene (PB) segments is straightforward since it appears in specific chemical shifts as indicated by $^1$H-NMR (Proton Nuclear Magnetic Resonance) spectra.

PE2: Synthesis of PS-b-PI-b-PB$_{1,2}$ Triblock Terpolymer

Polymerization of styrene, followed by that of isoprene, and of butadiene are the three basic steps for the synthesis of the specific final linear triblock terpolymer via anionic polymerization and high vacuum techniques. The difference with the previous sample is in the sequence between styrene and isoprene.

In a 2000 mL glass apparatus, the polystyrene (PS) living chain was synthesized by polymerizing 36.6 grams of styrene (0.35 mol) with sec-BuLi ($4 \times 10^{-4}$ mol) in 1200 mL of benzene at room temperature for 24 hours. The molecular weight of the first block [PS$^{(-)}$Li$^{(+)}$] was measured using GPC leading to a number average molecular weight ($M_n$) approximately equal to 90 kg/mol and a polydispersity index of 1.03.

Afterwards, 16.8 grams of isoprene (0.25 mol) were added and allowed to react for 24 hours at room temperature. The molecular weight of the living diblock copolymer macroanion [PS-b-PI$^{(-)}$Li$^{(+)}$] was measured by GPC leading to a value of $M_n$ approximately equal to 131 kg/mol and a polydispersity index of 1.05. As in the previous sample, 6 mL of 1,2-dipiperidinoethane ($8 \times 10^{-4}$ mol) diluted in benzene were added in the PS-b-PI$^{(-)}$Li$^{(+)}$ solution and it was left under stirring for 1 hour to alter the polarity. The molar ratio between the initial initiator concentration and that of the dipip was approximately 1:2.

Finally, 6.6 grams (0.12 mol) of 1,3 butadiene were added and allowed to react for 24 hours at 4° C. to better control the polymerization reaction. This procedure under the specific conditions described (concentration, temperature, solvent mixture) drives the reaction kinetics towards almost 100 mole percent 1,2-butadiene repeat unit addition and not the usual 92 mole percent 1,4-butadiene repeat units and 8 mole percent 1,2-butadiene repeat units, which would be obtained without polar additives during anionic polymerization. The molecular weight of the final triblock terpolymer (PS-b-PI-b-PB$_{1,2}$) was measured using GPC leading to a value of $M_n$ approximately equal to 147 kg/mol and a polydispersity index of 1.08.

The final triblock terpolymer ABC (approximately 57 grams) was precipitated in an excess of methanol and the precipitated terpolymer was left to dry in a high vacuum oven at 50° C. for 48 hours. After the polymerization of each monomer, a small amount (approximately 1 grams) was removed from the apparatus for characterization via GPC. As mentioned for the previous sample, the 100 percent-1,2 microstructure in the PB segments is straightforward since it appears in specific chemical shifts as indicated by $^1$H-NMR spectra.

EXAMPLES

Example 1: Hydrosilylation Reaction of PI-b-PS-b-PB$_{1,2}$ Triblock Terpolymer

In a 1000 mL glass apparatus, 20.0 grams of PI-b-PS-b-PB$_{1,2}$ (from PE1) were dissolved in 600 mL of tetrahydrofuran (THF). A few drops (approximately 0.1 mL, $2 \times 10^{-4}$ mol) of Karstedt's catalyst and 2 mL ($1.6 \times 10^{-2}$ mol) of trimethylchlorosilane (used as purifying agent) were added very slowly to the polymer solution. The solution was left under continuous stirring for 24 hours at room temperature. This procedure was performed to deactivate any impurities which otherwise will deactivate or minimize the efficiency of the catalyst. Afterwards, the necessary amount (2 mL, $1.8 \times 10-2$ mol) of chlorodimethylsilane [HSi(Me)$_2$Cl] was added, followed by immediate heating of the solution at 70° C. to initiate the modification reaction of the vinyl bond to a chlorosilyl functional group due to anti-Markownikoff addition. There was an induction period varying between 1 and 6 hours, followed by a rapid reaction being obvious by the change of the color of the solution. The reaction of hydrosilylation proceeded for at least 24 hours. After 24 hours, all the volatile media (THF and chlorosilanes) were removed in the high-vacuum line by pumping for 3-5 days. Finally, after reassuring the complete absence of any volatile media (especially the chlorodimethylsilane), the triblock terpolymer with hydrosilylated PB segments bearing one chlorine atom per monomeric unit was dissolved with the appropriate amount of benzene (500 mL), was freeze dried, was removed from the vacuum line by heat sealing, and was kept at −20° C. The yield of the hydrosilylation reaction was approximately 70 weight percent as already reported in the literature in such high molecular weight segments.

The diluted in benzene triblock terpolymer with the hydrosilylated PB segments was reacted in an ampule glass apparatus under vacuum with purified methoxyethanol. The alcohol was distilled under vacuum remaining in calcium hydride under stirring for at least 24 hours and was degassed at least two times to remove any traces of humidity. The reaction of the terpolymer with the alcohol took place at 75° C. under high vacuum and continuous reflux with an excess of methoxyethanol (approximately 10% compared to the moles of the triblock terpolymer). The substitution of the chlorine atoms with the ethyloxymethoxy groups is almost complete and HCl is formed. The mixture is neutralized with sodium bicarbonate followed by extraction with chloroform and rinsing for at least 3 times with 50 ml of chloroform each time to completely remove the HCl and the alcohol excess.

E2: Hydrosilylation Reaction of PS-b-PI-b-PB$_{1,2}$ Triblock Terpolymer

In a 1000 mL glass apparatus, 20.0 grams of PS-b-PI-b-PB$_{1,2}$ (from PE2) were dissolved in 600 mL of tetrahydrofuran (THF). A few drops (approximately 0.1 mL, $2 \times 10^{-4}$ mol) of Karstedt's catalyst and 2 mL ($1.6 \times 10^{-2}$ mol) of trimethylchlorosilane (used as purifying agent) were added very slowly in the polymer solution. The solution was left under continuous stirring for 24 hours at room temperature. This procedure was performed to deactivate any impurities which otherwise will deactivate or minimize the efficiency of the catalyst. Afterwards, the necessary amount (2 mL, $1.8 \times 10^{-2}$ mol) of chlorodimethylsilane [HSi(Me)$_2$Cl] was added, followed by immediate heating of the solution at 70° C. in order to initiate the modification reaction of the vinyl bond to chlorosilyl functional group due to anti-Markownikoff addition. There was an induction period varying between 1 and 6 hours, followed by a rapid reaction being obvious by the change of the color of the solution. The reaction of hydrosilylation proceeded for at least 24 hours. After 24 hours, all the volatile media (THF and chlorosilanes) were removed in the high-vacuum line by pumping for 3-5 days. Finally, after assuring the complete absence of any volatile media (especially the chlorodimethylsilane) the triblock terpolymer with hydrosilylated PB segments bearing one chlorine atom per monomeric unit was dissolved with an appropriate amount of benzene (500 mL), was freeze dried, was removed from the vacuum line by heat sealing, and was kept at −20° C. The yield of the hydrosilylation reaction was approximately 70 weight percent as already reported in the literature in such high molecular weight segments.

The diluted in benzene triblock terpolymer with the hydrosilylated PB segments was reacted in an ampule glass apparatus under vacuum with purified methoxyethanol. The alcohol was distilled under vacuum remaining in calcium hydride under stirring for at least 24 hours and was degassed at least two times to remove any traces of humidity. The reaction of the terpolymer with the alcohol took place at 75° C. under high vacuum and continuous reflux with an excess of methoxyethanol (approximately 10% compared to the moles of the triblock terpolymer). The substitution of the chlorine atoms with the ethyloxymethoxy groups is almost complete and HCl is formed. The mixture is neutralized with sodium bicarbonate followed by extraction with chloroform and rinsing for at least 3 times with 50 ml of chloroform each time in order to completely remove the HCl and the alcohol excess.

E3: Hydrosilylation Reaction of PS-b-PI-b-PB$_{1,2}$ Triblock Terpolymer

In a 1000 mL glass apparatus, 20.0 grams of PI-b-PS-b-PB$_{1,2}$ were dissolved in 600 mL of tetrahydrofuran (THF). A few drops (approximately 0.1 mL, $2 \times 10^{-4}$ mol) of Karstedt's catalyst and 2 mL ($1.6 \times 10^{-2}$ mol) of trimethylchlorosilane (used as purifying agent) were added very slowly in the polymer solution. The solution was left under continuous stirring for 24 hours at room temperature. This procedure was performed to deactivate any impurities which otherwise will deactivate or minimize the efficiency of the catalyst. Afterwards the necessary amount (2 mL, $1.8 \times 10^{-2}$ mol) of dichloromethylsilane (HSiMeCl$_2$) was added, followed by immediate heating of the solution at 70° C. in order to initiate the modification reaction of the vinyl bond to dichlorosilyl functional group due to anti-Markownikoff addition. There was again an induction period varying between 1 and 6 hours, followed by a rapid reaction being obvious by the change of the color of the solution. The reaction of hydrosilylation proceeded for at least 24 hours. After 24 hours all the volatile media (THF and chlorosilanes) were removed in the high-vacuum line by pumping for 3-5 days. Finally, after reassuring the complete absence of any volatile media (especially the dichloromethylsilane), the triblock terpolymer with hydrosilylated PB segments bearing two chlorine atoms per monomeric unit was dissolved with an appropriate amount of benzene, was removed from the vacuum line, and was kept at −20° C. The yield of the hydrosilylation reaction was approximately 70 weight percent as already reported in the literature in such high molecular weight segments.

The diluted in benzene triblock terpolymer with the hydrosilylated PB segments was reacted in an ampule glass apparatus under vacuum with purified methoxyethanol. The alcohol was distilled under vacuum remaining in calcium hydride under stirring for at least 24 hours and was degassed at least two times to remove any traces of humidity. The reaction of the terpolymer with the alcohol took place at 75° C. under high vacuum and continuous reflux with an excess of methoxyethanol (approximately 10% compared to the moles of the triblock terpolymer). The substitution of the chlorine atoms with the ethyloxymethoxy groups is almost complete and HCl is formed. The mixture is neutralized with sodium bicarbonate followed by extraction with chloroform and rinsing for at least 3 times with 50 ml of chloroform each time in order to completely remove the HCl and the alcohol excess.

E4: Hydrosilylation of PI-PS-(1,2-PB)

PE1 (12.53 g, 42.6 mmol polybutadiene pendant vinyl groups) was dissolved in THF (70.0 mL) in a 350 mL sealable glass pressure vessel equipped with stir bar. Once polymer had dissolved, Karstedt's catalysts was added (0.350 mL, 7 mg Pt, 0.036 mmol Pt) followed by chlorodimethylsilane (4.0 mL, 36 mmol). The pressure vessel was capped and heated to 85° C. for 12 hours before being cooled to room temperature. Initiation is indicated by a darkening of the solution from colorless to dark yellow, orange, or light brown as Pt nanoparticles are formed. A highly variable latency period ranging from 10 minutes to four hours was observed.

Once cooled to room temperature, aniline (5.0 mL, 54.9 mmol) and 2-methoxyethanol (4.3 mL, 54.5 mmol) were sequentially added. Over a period of thirty minutes, fine white precipitate formed. After stirring for an additional two hours, the reaction was filtered through diatomaceous earth and evaporated to dryness. The polymeric residue was extracted with dichloromethane, and the solution filtered through diatomaceous earth. The product filtrate was then re-dissolved in THF prior to precipitation from methanol.

Polymer was characterized by NMR and GPC after drying. 1H-NMR indicates approximately 60 mole percent conversion of polybutadiene pendant C═C, with less than 10 mole percent conversion of polyisoprene pendant C═C. GPC shows a slight increase in polydispersity index to approximately 1.3.

Dynamic Light Scattering (DLS) Studies

The terpolymer prepared in Example E4 was first evaluated for its solubility at 0.1 weight % in single solvent systems: NMP, THF, acetone, DMAc, and MEK. The polymer formed a clear, colorless solution in THF and MEK. In acetone, the material remained undissolved and appeared opaque. In DMAc, the material looked a little swollen and was slightly translucent. In NMP, the material broke up into small, clear, bluish gel-like pieces. The solutions in THF, MEK and NMP were filtered and examined by DLS. A bimodal size distribution appears in each of these samples with one peak in the 10-100 nm range and another in the 80-500 nm range, suggesting the presence of both free chains and micelles in each of the filtered solutions. The relative presence of free chains, micelles and undissolved material in each of these solvents is recorded in Table 2.

The polymer was also evaluated in 50/50 w/w solvent pairs: NMP/THF, acetone/THF, DMAc/THF, NMP/MEK, acetone/MEK and DMAc/MEK. The results are recorded in Table 2. In addition to micelles and free chains, one of the solutions (50/50 acetone/THF) exhibited a peak in the 400-2000 nm range, suggesting aggregates.

TABLE 2

DLS results for E4 in single solvents and solvent pairs

| Polymer | Solvent Pair | 100/0 | 50/50 | 0/100 |
|---------|--------------|-------|-------|-------|
| E4 | NMP/THF | U-fM | Fm | Fm |
| E4 | Actn/THF | U | Fma | Fm |
| E4 | DMA/THF | U | Fm | Fm |
| E4 | NMP/MEK | U-fM | fM | FM |
| E4 | Actn/MEK | U | M | FM |
| E4 | DMA/MEK | U | M | FM |

In Table 2, U refers to undissolved pieces, F or f refer to free chains (peak at 10-100 nm), M or m refer to micelles (peak at 40-500 nm), A or a refer to aggregates (peak at 400-2000 nm). An upper case (F, M, A) indicates a majority population and a lower case (f, m, a) indicates a minority population.

Membrane Preparation: Casting of E4

E4 block copolymer was dissolved in various solvents at concentrations of 12-16 wt. 00 and cast at 8 mil (203.2 micrometers) with evaporation periods from 10-25 seconds at the conditions listed in Table 3, below. When immersed into a water bath, the coatings became opaque. Examination of the membrane surfaces by tapping mode AFM revealed in some cases 10-200 nanometer (nm) pores (interpreted as where the discontinuous regions of 10 to 200 nm size-scale appear as minima in the height map as well as minima in the phase map) as indicated in Table 3. The membranes did not wet with a sessile drop of water, but some did wet by a sessile drop of IPA, as indicated in Table 3.

TABLE 3

Membranes Prepared from E4

| Example | Solvent | Concentration | Evap. Time, seconds | Appearance by AFM | Wetting by IPA |
|---------|---------|---------------|---------------------|-------------------|----------------|
| E5 | 60/40 NMP/THF | 12 wt % | 15 | Pores not seen | Slow |
| E6 | 60/40 NMP/THF | 12 wt % | 20 | Pores not seen | No |
| E7 | 60/40 NMP/THF | 12 wt % | 25 | Pores not seen | No |
| E8 | 50/50 NMP/THF | 12 wt % | 10 | Porous appearance | Slow |
| E9 | 50/50 NMP/THF | 12 wt % | 15 | Pores not seen | No |
| E10 | 50/50 NMP/THF | 12 wt % | 20 | Pores not seen | No |
| E11 | 50/50 NMP/THF | 14 wt % | 10 | Pores not seen | Yes |
| E12 | 50/50 NMP/THF | 14 wt % | 15 | Pores not seen | Slow |
| E13 | 50/50 NMP/THF | 14 wt % | 20 | Pores not seen | No |
| E14 | 50/50 NMP/THF | 14 wt % | 25 | Pores not seen | No |
| E15 | 50/50 NMP/THF | 14 wt % | 30 | Pores not seen | No |
| E16 | 40/60 DMAc/THF | 14 wt % | 10 | Porous appearance | Yes |
| E17 | 40/60 DMAc/THF | 14 wt % | 15 | Porous appearance | Yes |
| E18 | 40/60 DMAc/THF | 14 wt % | 20 | Porous appearance | Yes |
| E19 | 40/60 DMAc/THF | 14 wt % | 25 | Some regions appear porous | Yes |
| E20 | 40/60 DMAc/THF | 16 wt % | 10 | Porous appearance | Yes |
| E21 | 40/60 DMAc/THF | 16 wt % | 15 | Some regions appear porous | Yes |
| E22 | 40/60 DMAc/THF | 16 wt % | 20 | Pores not seen | Yes |

The peak force tapping mode AFM of E17 is FIG. 1.

The invention claimed is:

1. An amphiphilic triblock copolymer comprising:
20 to 45 mole percent A block based on total moles of repeat units in the amphiphilic triblock copolymer, wherein the A block comprises poly(isoprene) and greater than 90 mole percent of the repeat units in the A block are of Formula (I-A)

$$*-CH_2-CH=C(CH_3)-CH_2-*; \tag{I-A}$$

40 to 65 mole percent B block based on total moles of repeat units in the amphiphilic triblock copolymer, wherein the B block comprises a poly(vinyl aromatic); and 5 to 30 mole percent C blocks based on total moles of repeat units in the amphiphilic triblock copolymer, wherein greater than 30 mole percent of the repeat units in the C block are hydrosilylated 1,2-butadiene repeat units of Formula (IV-A) and/or Formula (IV-B)

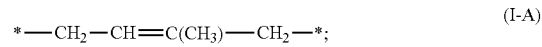

(IV-A)

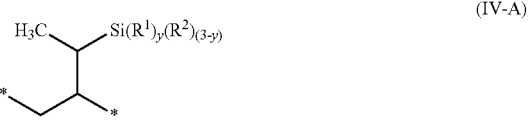

(IV-B)

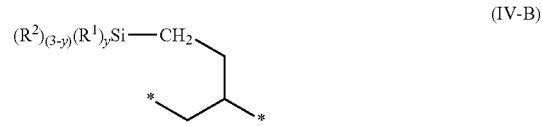

wherein
$R^1$ is an alkyl or aryl;
$R^2$ is a group of formula $-O-(R^3-O)_p-R^4$; and $R^3$ is an alkylene;
$R^4$ is an alkyl;
y is an integer equal to 1 or 2;
p is an integer in a range of 0 to 10; and
an asterisk (*) indicates a binding site to another repeat unit or terminal group of the amphiphilic triblock copolymer.

2. The amphiphilic triblock copolymer of claim 1, wherein the A block further comprises up to 10 mole percent repeat blocks of Formula (I-B)

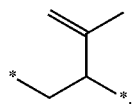
(I-B)

3. The amphiphilic triblock copolymer of claim 1, wherein the B block comprises repeat units derived from styrene-type monomers of Formula (III-A) and/or (III-B)

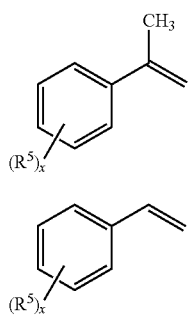
(III-A)

(III-B)

wherein
$R^5$ is an alkyl; and
x is an integer in a range from 0 to 3.

4. The amphiphilic triblock copolymer of claim 1, wherein at least 70 mole percent of the repeat units in the C block are hydrosilylated 1,2-butadiene repeat units of Formula (IV-A) and/or Formula (IV-B).

5. The amphiphilic triblock copolymer of claim 1, wherein a ratio of the mole percent of repeat units in the B block in the amphiphilic triblock copolymer to the mole percent of repeat units in the A block in the amphiphilic triblock copolymer is in a range of 3:1 to 1:1.

6. The amphiphilic triblock copolymer of claim 1, wherein the amphiphilic triblock copolymer has a number average molecular weight in a range of 20,000 to 500,000 Daltons.

7. The amphiphilic triblock copolymer of claim 1, wherein the amphiphilic triblock copolymer is an ABC triblock copolymer.

8. An article comprising the amphiphilic triblock copolymer of claim 1.

9. The article of claim 8, wherein the article is a porous membrane.

10. The article of claim 9, wherein the average pore size is in a range of 1 to 500 nanometers.

11. A method of forming an amphiphilic triblock copolymer, the method comprising:
1) Providing or obtaining a precursor triblock copolymer comprising 20 to 45 mole percent $A^1$ block based on total moles of repeat units in the precursor triblock copolymer, wherein the $A^1$ block comprises poly(isoprene) and greater than 90 mole percent of the repeat units in the $A^1$ block are of Formula (I-A)

(I-A)

40 to 65 mole percent $B^1$ block based on total moles of repeat units in the precursor triblock copolymer, wherein the $B^1$ block comprises a poly(vinyl aromatic);
and 5 to 30 mole percent $C^1$ blocks based on total moles of repeat units in the precursor triblock copolymer, wherein greater than 30 mole percent of the repeat units in the $C^1$ block are 1,2-butadiene repeat units of Formula (VII)

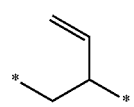
(VII)

2) reacting the 1,2-butadiene repeat units in the $C^1$ block of the precursor triblock copolymer with a halogenated silane of Formula (VIII)

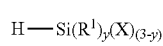
(VIII)

in the presence of an organometallic catalyst to form a halogenated intermediate triblock copolymer having repeat units of Formula (IX-A) and Formula (IX-B)

(IX-A)

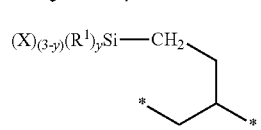
(IX-B)

wherein
$R^1$ is an alkyl or aryl;
X is a halo;
y is an integer equal to 1 or 2; and
3) treating the halogenated intermediate triblock copolymer with a compound of Formula (X)

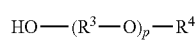
(X)

to form the amphiphilic triblock copolymer having a C block comprising repeat units of Formula (IV-A) and/or Formula (IV-B)

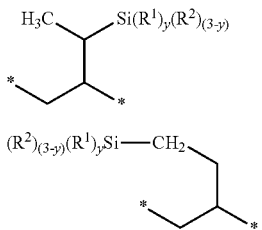

(IV-A)

(IV-B)

wherein

R² is a group of formula —O—(R³—O)_p—R⁴,

R³ is an alkylene;

R⁴ is an alkyl;

p is an integer in a range of 0 to 10; and an asterisk (*) indicates a binding site to another repeat unit or terminal group of the precursor triblock copolymer, halogenated intermediate triblock copolymer, or amphiphilic triblock copolymer.

12. The method of claim 11, wherein the organometallic catalyst comprises a platinum-containing compound or a rhodium-containing compound.

13. The amphiphilic triblock copolymer of claim 1, wherein the A block contains less than 5 mole percent repeat units of Formula (II)

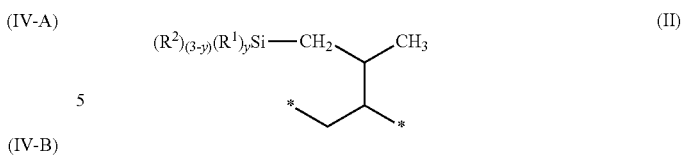

where R¹ is an alkyl or aryl;

R² is a group of formula —O—(R³—O)_p—R⁴, and

R³ is an alkylene;

R⁴ is an alkyl;

y is an integer equal to 1 or 2; and p is an integer in a range of 0 to 20.

14. The amphiphilic triblock copolymer of claim 1, wherein the B block has a glass transition temperature of at least 90° C. when measured using differential scanning calorimetry.

15. The amphiphilic triblock copolymer of claim 1, wherein the C block comprises at least 70 mole percent repeat units of Formula (IV-A) and/or Formula (IV-B).

16. The amphiphilic triblock copolymer of claim 1, wherein the C block comprises at least 90 mole percent repeat units of Formula (IV-A) and/or Formula (IV-B).

17. The amphiphilic triblock copolymer of claim 1, wherein the amphiphilic triblock copolymer has a number average molecular weight of at least 80,000 Daltons up to 300,000 Daltons.

18. The article of claim 9, wherein the porous membrane has asymmetric pores.

* * * * *